United States Patent
Fouda

(10) Patent No.: US 11,593,912 B2
(45) Date of Patent: Feb. 28, 2023

(54) SUBSURFACE FORMATION IMAGING

(71) Applicant: Halliburton Energy Services, Inc., Houston, TX (US)

(72) Inventor: Ahmed Elsayed Fouda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/187,742

(22) Filed: Feb. 27, 2021

(65) Prior Publication Data

US 2021/0183009 A1    Jun. 17, 2021

Related U.S. Application Data

(63) Continuation of application No. 16/552,721, filed on Aug. 27, 2019, now Pat. No. 10,970,814.

(Continued)

(51) Int. Cl.
*G06T 3/00* (2006.01)
*G06F 16/587* (2019.01)
(Continued)

(52) U.S. Cl.
CPC .......... *G06T 3/0068* (2013.01); *E21B 49/00* (2013.01); *G06F 16/587* (2019.01); *G06T 7/13* (2017.01);
(Continued)

(58) Field of Classification Search
CPC ......... G06T 3/0068; G06T 7/13; G06T 7/337; G06T 2207/20021; G06T 2207/30181;
(Continued)

(56) References Cited

U.S. PATENT DOCUMENTS 3,060,373 A    10/1962  Henri-Georges
3,132,298 A     5/1964  Henri-Georges et al.
(Continued)

FOREIGN PATENT DOCUMENTS

CA      685727 A      5/1964
CA   2845910 A1 *    9/2014    ......... E21B 47/0002
(Continued)

OTHER PUBLICATIONS

Chen, et al., "A Novel Array Laterlog Method", The Log Analyst, 39(5), Jan. 1, 1998, pp. 23-33.
(Continued)

*Primary Examiner* — Richard A Hansell, Jr.
(74) *Attorney, Agent, or Firm* — DeLizio, Peacock, Lewin & Guerra

(57) ABSTRACT

A method includes generating a set of sub-images of a subsurface formation based on measurement values acquired by a plurality of sensors corresponding to one or more signals that have propagated through the subsurface formation, wherein each of the set of sub-images correspond to one of the plurality of sensors. The plurality of sensors are on a tool in a borehole, wherein each of the plurality of sensors are at different spatial positions with respect to each other. The method also includes generating a combined image by aligning the set of sub-images based on the measurement values, wherein the aligning of the set of sub-images is independent of acceleration of the tool during tool motion.

20 Claims, 16 Drawing Sheets

Related U.S. Application Data

(60) Provisional application No. 62/724,923, filed on Aug. 30, 2018.

(51) Int. Cl.
| | |
|---|---|
| *G06T 7/33* | (2017.01) |
| *G06T 7/13* | (2017.01) |
| *H04N 5/225* | (2006.01) |
| *E21B 49/00* | (2006.01) |
| *H04N 5/247* | (2006.01) |

(52) U.S. Cl.
CPC ........... *G06T 7/337* (2017.01); *H04N 5/2253* (2013.01); *H04N 5/247* (2013.01); *G06T 2207/20021* (2013.01); *G06T 2207/30181* (2013.01); *H04N 2005/2255* (2013.01)

(58) Field of Classification Search
CPC ......... G06T 2207/30108; G06T 3/4038; E21B 49/00; G06F 16/587; H04N 5/2253; H04N 5/247; H04N 2005/2255; H04N 5/23238
See application file for complete search history.

(56) References Cited

U.S. PATENT DOCUMENTS

| | | | |
|---|---|---|---|
| 3,379,963 | A | 4/1968 | Saurenman |
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A | 4/1991 | Chen |
| 5,038,378 | A | 8/1991 | Chen |
| 5,299,128 | A | 3/1994 | Antoine et al. |
| 6,191,588 | B1 | 2/2001 | Chen |
| RE42,493 | E | 6/2011 | Tabarovsky |
| 8,579,037 | B2 | 11/2013 | Jacob |
| 9,697,620 | B2 | 7/2017 | Elkington et al. |
| 2004/0005082 | A1* | 1/2004 | Lee .................. G06T 7/254 382/103 |
| 2005/0132794 | A1* | 6/2005 | Spross ................ E21B 45/00 73/152.16 |
| 2006/0031017 | A1* | 2/2006 | Mathieu .................. G01V 3/20 702/6 |
| 2007/0211928 | A1* | 9/2007 | Weng .................. G06V 20/695 382/128 |
| 2008/0049994 | A1* | 2/2008 | Rognin ................... G06T 7/35 382/128 |
| 2011/0255370 | A1* | 10/2011 | Hirabayashi ............ G01V 1/42 367/43 |
| 2012/0169841 | A1* | 7/2012 | Chemali ............... E21B 47/002 348/E7.001 |
| 2014/0260590 | A1 | 9/2014 | Gerrie |
| 2015/0107824 | A1* | 4/2015 | Signorelli ............. H02J 7/0016 166/244.1 |
| 2015/0185345 | A1 | 7/2015 | Albertin et al. |
| 2017/0337675 | A1* | 11/2017 | Gelman .................. G01V 3/38 |
| 2018/0330472 | A1* | 11/2018 | Elhage .................. G06T 5/003 |
| 2019/0187316 | A1* | 6/2019 | Mathiszik ............. E21B 47/095 |
| 2020/0074588 | A1 | 3/2020 | Fouda |
| 2021/0181370 | A1* | 6/2021 | Zimmermann ...... G06N 3/0472 |

FOREIGN PATENT DOCUMENTS

| | | | | |
|---|---|---|---|---|
| CA | 2845910 | A1 | | 9/2014 |
| EP | 1429157 | B1 | | 10/2009 |
| EP | 2966258 | A1 * | 1/2016 | .......... E21B 47/044 |
| EP | 2966258 | A1 | | 1/2016 |
| WO | 2014200996 | A2 | | 12/2014 |
| WO | 2019177588 | A1 | | 9/2019 |

OTHER PUBLICATIONS

Davies, et al., "Azimuthal Resistivity Imaging: A New Generation Laterolog", SPE Formation Evaluation, 9(3), Jan. 1, 1994, pp. 165-174.

Guner, et al., "Quantitative Demonstration of a High-Fidelity Oil-Based Mud Resistivity Imager Using a Controlled Experiment", Paper presented at the SPWLA 61st Annual Logging Symposium, Virtual Online Webinar, Jun. 2020. doi: https://doi.org/10.30632/SPWLA-5010, 11 pages.

Safinya, et al., "Improved Formation Imaging With Extended Microelectrical Arrays", Paper presented at the SPE Annual Technical Conference and Exhibition, Dallas, Texas, Oct. 1991. doi: https://doi.org/10.2118/22726-MS, 12 pages.

Smits, et al., "High Resolution From a New Laterolog With Azimuthal Imaging", SPE 30584, SPE Annual Technical Conference and Exhibition, Oct. 22-25, Dallas, Texas, Jan. 1, 1995, pp. 563-576.

Suau, et al., "The Dual Laterolog-Rxo Tool", Fall Meeting of the Society of Petroleum Engineers of AIME, Oct. 8-11, 1972, San Antonio, Texas, 44 pages.

Vigne, et al., "Strange Invasion Profiles: What Multiarray Induction Logs Can Tell Us About How Oil-Based Mud Affects the Invasion Process and Wellbore Stability", Paper presented at the SPWLA 38th Annual Logging Symposium, Houston, Texas, Jun. 1997., 12 pages.

PCT Application Serial No. PCT/US2019/048557, International Search Report, dated Dec. 12, 2019, 3 pages.

PCT Application Serial No. PCT/US2019/048557, International Written Opinion, dated Dec. 12, 2019, 8 pages.

U.S. Appl. No. 16/552,721, Non-Final Office Action, dated Apr. 3, 2020, 17 pages.

U.S. Appl. No. 16/552,721, Final Office Action, dated Oct. 9, 2020, 18 pages.

U.S. Appl. No. 16/552,721, Notice of Allowance, dated Dec. 10, 2020, 14 pages.

Brown, et al., "Imaging: Getting the Picture Downhole", Oilfield Review 27.2, Sep. 2015, pp. 4-21.

* cited by examiner

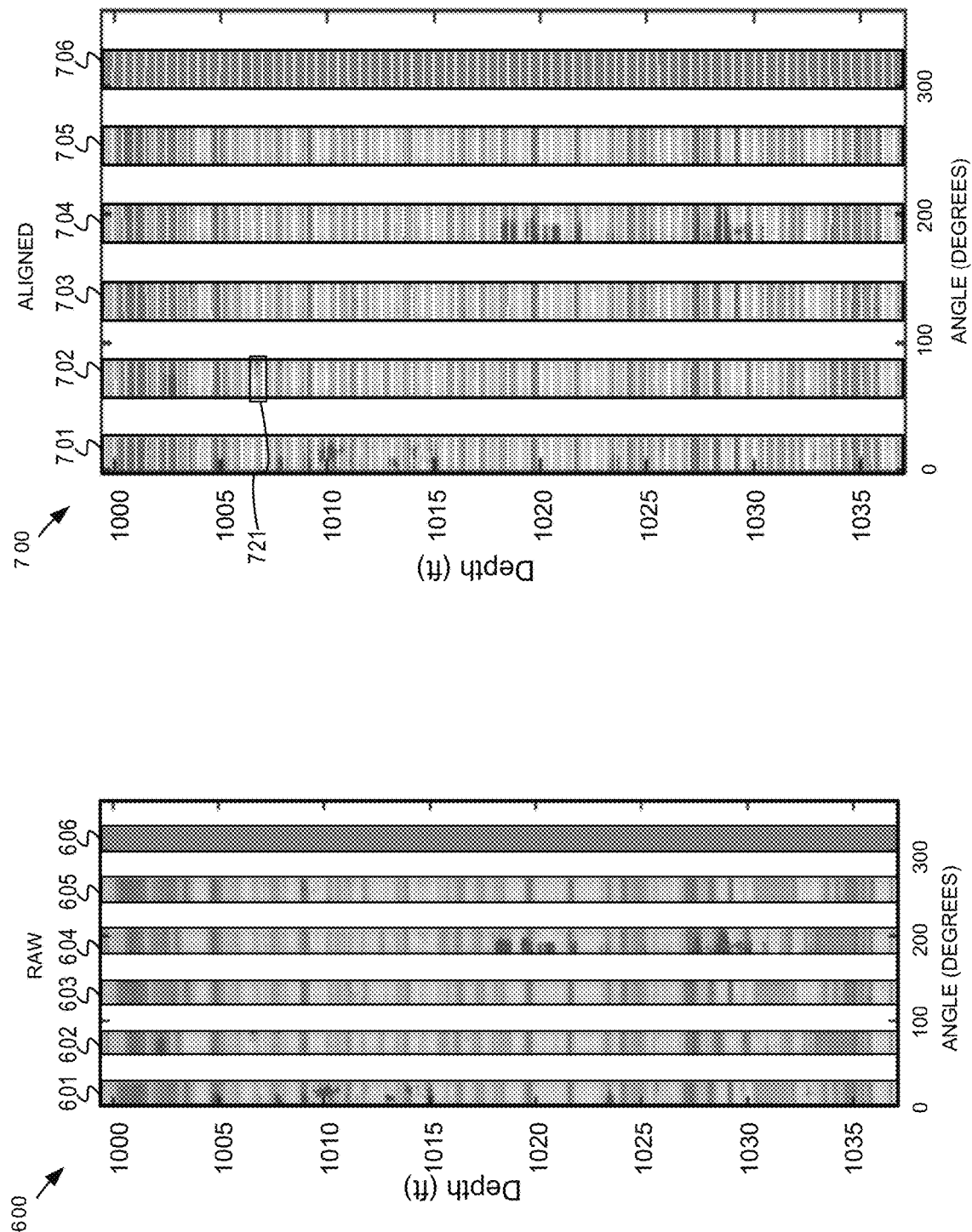

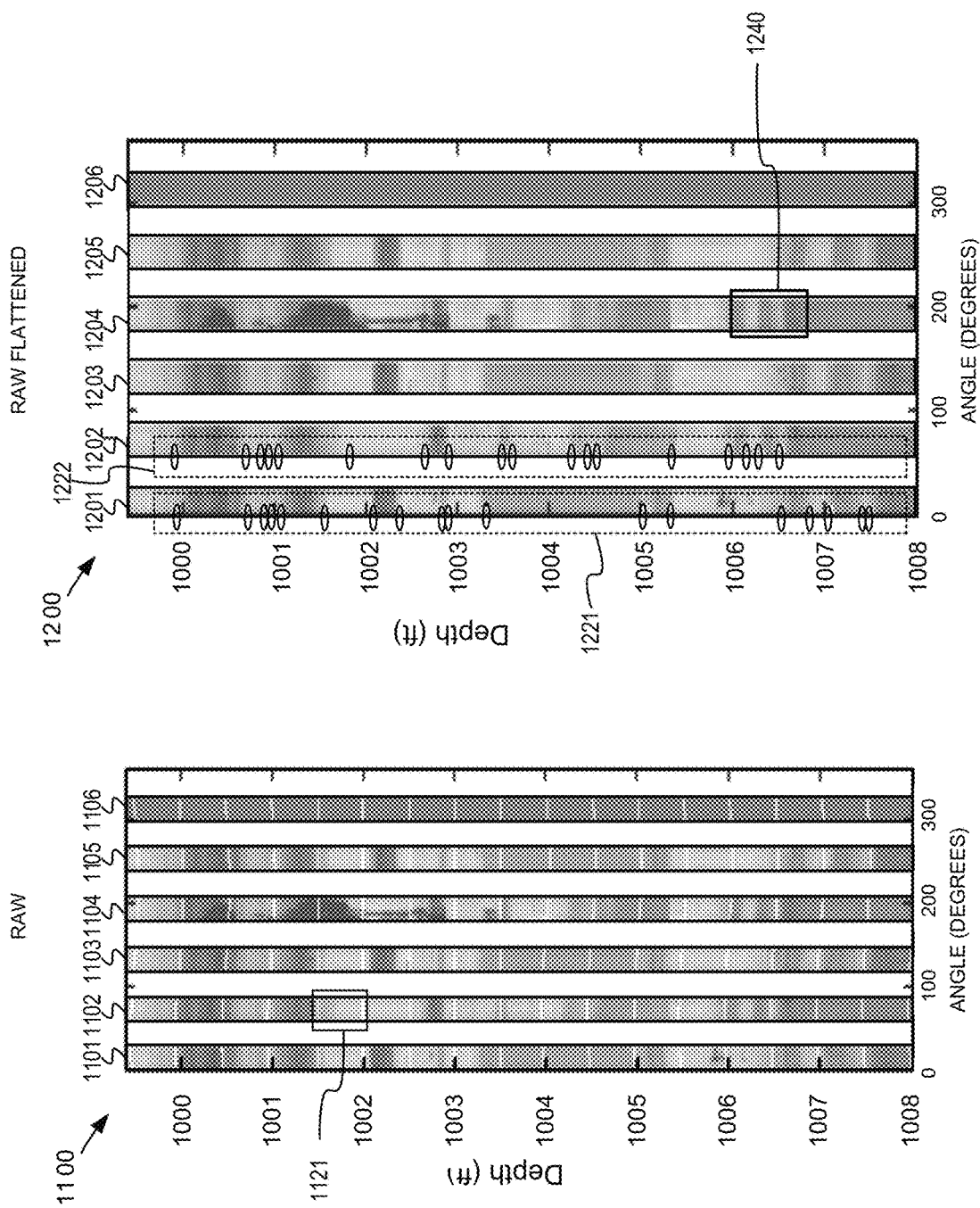

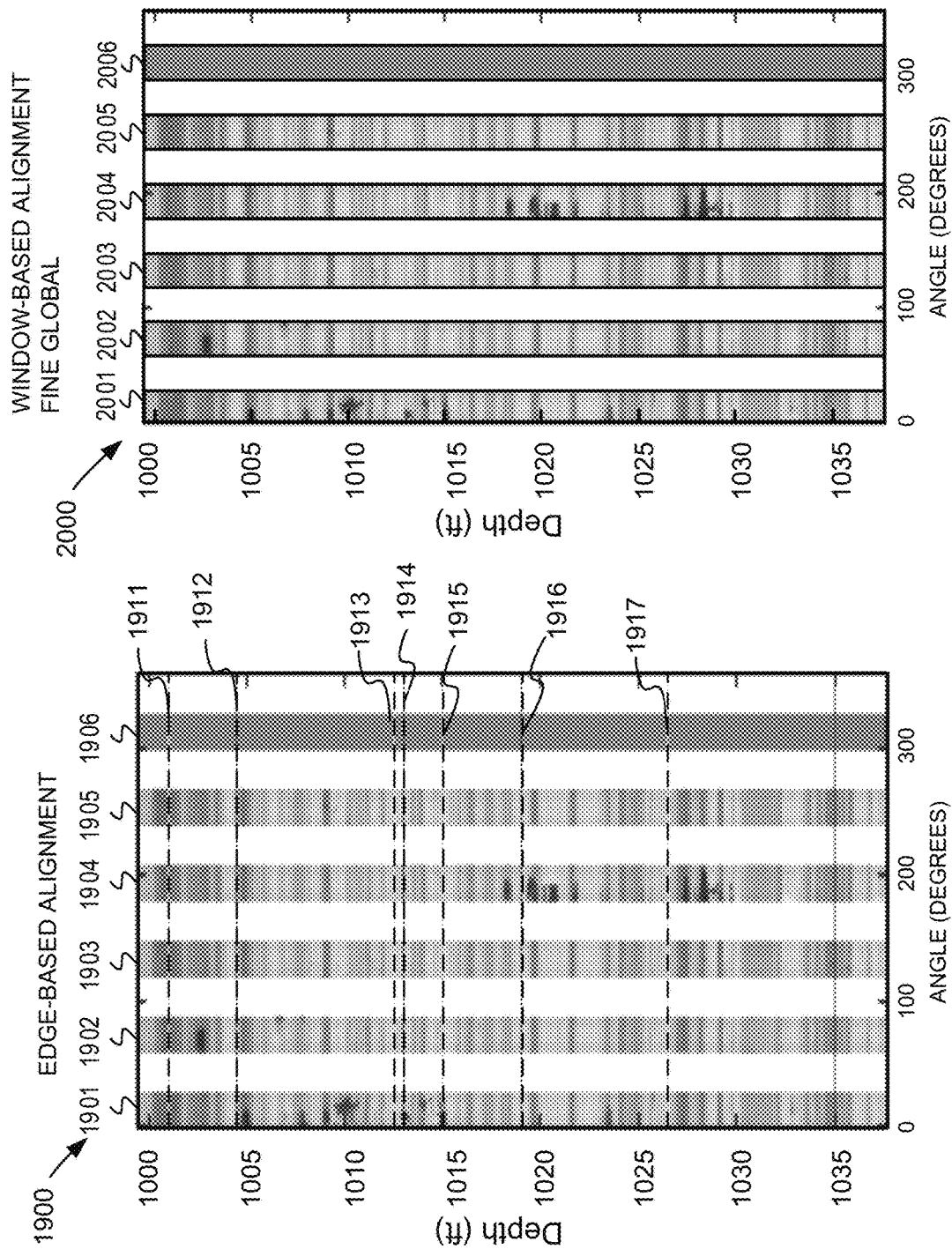

SUBSURFACE FORMATION IMAGING

PRIORITY APPLICATION

This application is a continuation application of U.S. patent application Ser. No. 16/552,721, filed Aug. 27, 2019, which claims the benefit of priority of U.S. Provisional Patent Application Ser. No. 62/724,923, filed Aug. 30, 2018, wherein both applications are incorporated herein by reference in their entirety.

TECHNICAL FIELD

The disclosure generally relates to the field of data processing, and more specifically to the field of signal processing.

BACKGROUND

In high resolution formation imagers, the imaging electrodes (buttons) are typically arranged in multiple rows or across multiple sets of pads that can be axially offset from each other to acquire imaging data around the periphery of a borehole. Due to the non-uniform movement of the tool while logging, images acquired across multiple electrodes, such as across two sets of pads, can be misaligned. Even a slight misalignment can affect the quality of the high-resolution image.

BRIEF DESCRIPTION OF THE DRAWINGS

Embodiments of the disclosure can be better understood by referencing the accompanying drawings.

FIG. 6 includes an example image before alignment.

FIG. 7 depicts an aligned image generated using a global, window-based alignment based on the image depicted in FIG. 6.

FIG. 11 includes a second example of an unaligned image.

FIG. 12 includes the unaligned image of FIG. 11 that has been flattened by conformal mapping along a formation dip direction.

FIG. 19 includes an image resulting from an edge-based alignment of the coarse global, window-based aligned dataset depicted in FIG. 18.

FIG. 20 includes an image resulting from a fine global, window-based alignment of the edge-based aligned dataset shown in FIG. 19.

DETAILED DESCRIPTION

Figure 1:
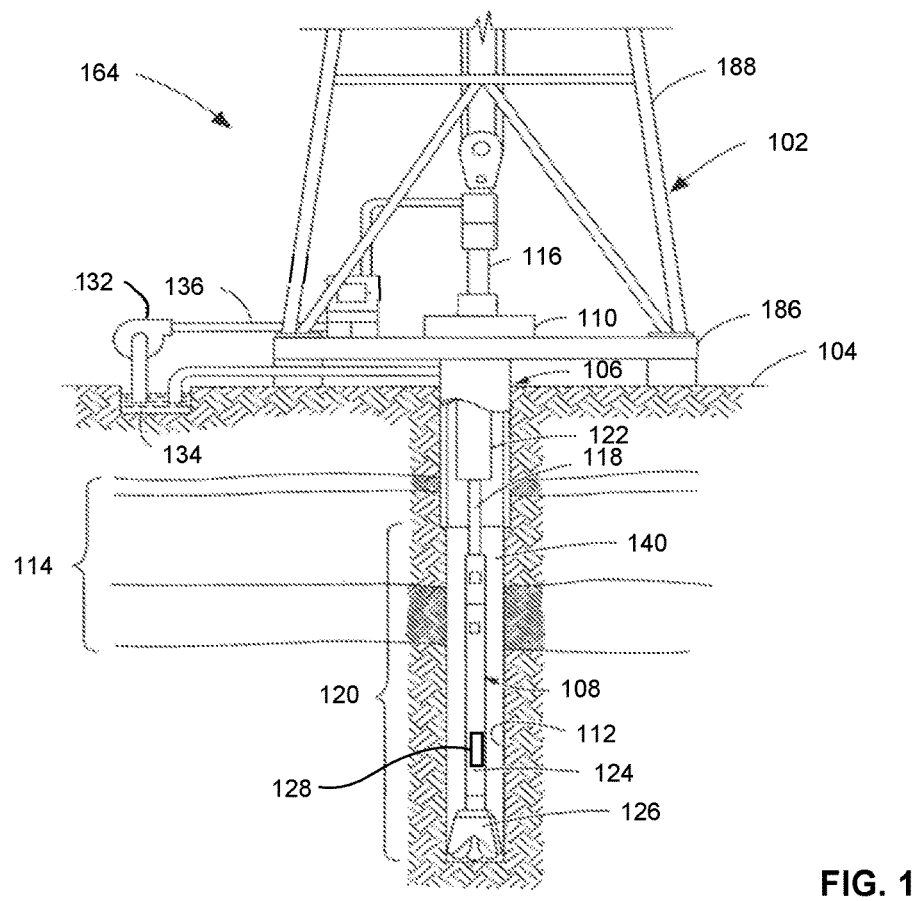
FIG. 1 is an elevation view of a drilling rig system.

The description that follows includes example systems, methods, techniques, and program flows that embody aspects of the disclosure. However, it is understood that this disclosure can be practiced without these specific details. For instance, this disclosure refers to sensors mounted on different pads in illustrative examples. Embodiments of this disclosure can be also applied to sensors having different spatial positions that are directly mounted on a tool body, positioned directly on elongated poles, etc. Additionally, well-known instruction instances, protocols, structures and techniques have not been shown in detail in order not to obfuscate the description.

High-resolution imaging tools provides more accurate measurements and a richer understanding of the features of a subsurface formation. However, non-uniform tool motion and unanticipated motion can create errors during measurement that decrease measurement precision and accuracy, reducing the benefits of high-resolution imaging tools. While these errors are sometimes corrected using a speed correction value that is calculated from accelerometer data and is used to position a data trace at the correct depth relative to other traces, the accuracy of the available accelerometer data may in turn limit the accuracy of well-aligned high-resolution images. For example, conventional approaches to combine multiple images can fail to correct for situations with extreme tool movement irregularities, such as those associated with stick-and-slip, wherein an accelerometer can miss non-predicted motion associated with the stick-and-slip phenomenon. The operations and related systems described in this application can provide an alternative mechanism, often independent of accelerometer data, to increase the accuracy of images acquired during the use of high-resolution imaging tools.

Various embodiments relate to the processing of multiple images of formations surrounding a borehole. It should be understood herein that an "image" refers to a set of values that are either direct measurements by sensors and/or calculated from the direct measurements by sensors, wherein the image is stored in a data structure that can be graphically represented. As used in this disclosure, the term "image visualization" refers to a physical representation of an image, wherein the representation is at least one of twodimensional or three-dimensional visualization such as a graph, picture, virtual three-dimensional simulated environment, hologram, etc. A downhole tool can include multiple imaging sensors positioned in any multi-row and/or multi-pad arrangement that can capture different images of the surrounding formation. These imaging sensors can be in multiple rows or even multiple sets of pads that can be axially and/or azimuthally offset, wherein each imaging sensor can be used to acquire measurements that can be used directly to generate a sub-image and/or can be processed to form a sub-image. Collective, the measurements from each of the imaging sensors can be used to generate a set of set of sub-images of a subsurface formation.

In some embodiments, images can be aligned based solely on the correlation of image features and independent of any accelerometer data. A device or system can perform operations to align the images that include one or more global, window-based alignment operations. These global, window-based alignment operations can reduce inaccuracies caused by misalignments that result from lower-impulse tool movement irregularities (sometimes referred to as "non-severe" tool movement irregularities). A window-based alignment operation can include operations to divide a set of sub-images into windows and aligning the windows using relative shifts with respect to each other, wherein the values of the relative shifts can be determined based on calculated formation properties such as formation dip and/or mismatches with respect to a reference value also determined from another set of sub-images. In addition, the device or system can shift the windows with respect to each other and increase the alignment of the sub-images measured by sensors on the high-resolution imaging tools.

The device or system can also perform alignment operations that include local edge-based alignment in selected zones. These local edge-based alignments can decrease inaccuracies caused by misalignments that result from high-impulse tool movement irregularities (sometimes referred to as "severe tool movement irregularities") such as those that may occur in stick-and-slip situations. In some embodiments, the device or system can select zones for edge-based alignment based on the outcome from a global, window-based alignment operations. In addition, the device or system can perform operations to correlate values in an aligned image to the values of other well logs with respect to one or more shared corresponding depth values based on accelerometer data. Various embodiments can thus address different causes of image misalignment, including those arising from stick-and-slip situations.

In some embodiments, a well tool can travel through a section of a formation multiple times. The sensors can acquire a plurality of images over these multiple passes. Various embodiments can be used to align images acquired from different passes for verifying measurement repeatability and achieving a higher borehole coverage. In addition, the device or system can perform operations to align an image with a reference log from a different tool. In addition, a quality indicator for the image quality can be provided based on mismatch values and/or thresholds used to generate a combined image. In addition, the device or system can provide a drilling status indicator such as an indicator for a stick-and-slip condition. Additionally, in some embodiments, formation dip and azimuth can also be computed using the aligned images. In some embodiments, these aligned images can be used for comparison with data from other tools and for generation of 360-degree images.

By applying the methods and/or using the related systems described herein, image measurement inaccuracies can be reduced, increasing the accuracy of acquired subsurface images in mapping features of a subsurface formation, and the efficiency of subsurface imaging operations. In addition, the methods can reduce the time used to align formation images from a plurality of sensors. Furthermore, the operations described in this disclosure can be independent of any accelerometer measurements, and thus can be applicable over a wide range of subsurface applications.

FIG. 1 depicts a drilling rig system 164 according to some embodiments. System 164 may include a drilling rig 102 located at the surface 104 of a well 106. Drilling of oil and gas wells is commonly carried out using a string of drill pipes connected together so as to form a drilling string 108 that is lowered through a rotary table 110 into a borehole 112. System 164 includes a drilling platform 186 equipped with a derrick 188 that supports a hoist.

The drilling rig 102 can thus provide support for the drill string 108. The drill string 108 can operate to penetrate the rotary table 110 for drilling the borehole 112 through subsurface formations 114. The drill string 108 can include a Kelly 116, drill pipe 118, and a bottom hole assembly (BHA) 120, perhaps located at the lower portion of the drill pipe 118. The BHA 120 can include drill collars 122, a downhole tool 124, and a drill bit 126. The drill bit 126 can operate to create borehole 112 by penetrating the surface 104 and subsurface formations 114.

The downhole tool 124 can comprise any number of different types of tools including MWD (measurement while drilling) tools, LWD (logging while drilling) tools, and others. Images of subsurface formations 114 can be captured by the downhole tool 124, wherein the downhole tool can be a high-resolution imaging tool having a plurality of sensors 128 to acquire signals and generate measurements used to generate sub-images. As can be seen in FIG. 1, each of the plurality of sensors 128 may be at different azimuthal and/or spatial position with respect to each other.

Figure 3A:
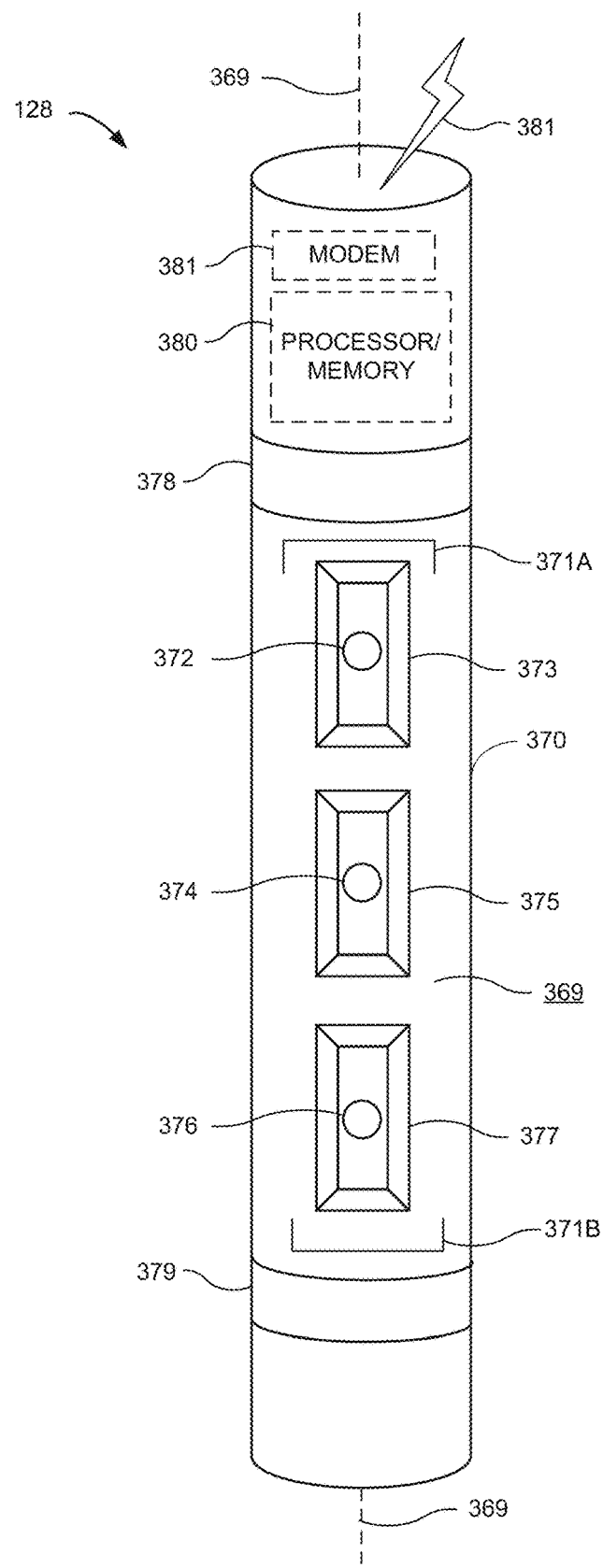
FIG. 3A depicts an isometric view of a downhole tool with multiple sensors.

In various embodiments, sensors 128 may be configured as shown in FIG. 3A, wherein sensors 128 include a tool body 370 having a generally cylindrical shape, with pads 373, 375, and 377 positioned in a vertical arrangement relative to one another between graphical brackets 371A and 371B. Each of pads 373, 375, and 377 may include a top surface that is positioned away from an outer surface 369 of tool body 370 to provide a pad area where respective sensor devices 372, 374, and 376 are located. However, in various embodiments, the top surfaces of pads 372, 374, and/or 376 may be flush with or be positioned below outer surface 369. Sensor devices 372, 374, and 376 are not limited to any particular type of sensor devices, and may be resistive sensor devices in some examples configured to measure impedances based on currents transmitted from one or more electrodes 378, 379 positioned on tool body 370. Embodiments of sensors 128 may include a plurality of vertical rows of non-extendible pads, such as pads 373, 375, and 377 positioned at various radial positions around the outer surface 369 of tool body 370. For example, a second set of pads may be positioned on outer surface 369 and arranged in a vertical arrangement similar to or the same as pads 373, 375, and 377, and at a position one hundred and eighty degrees around the outer surface 369 of the tool body relative to the position of pads 373, 375, 377. In other embodiments, three sets of vertically arranged pads may be included on the outer surface 369 of the tool body 370, wherein each set of vertically arranged pads may be positioned and spaced apart by relative to one another by a one hundred and twenty degree of separation around outer surface of the tool body. In various embodiments, different sets of vertically arranges pads are not positioned at a same positions relative to the longitudinal axis 368 of tool body 370, and may be positioned in a staggered pattern relative to one another. Positioning of the pads and/or sensors that may be included on surface 369 of tool body 370 are not limited to any particular patterns or arrangements relative to one another, and may include various vertical and rotational positioning combinations.

Referring to both FIG. 1 and FIG. 3A, during drilling operations, the drill string 108 (perhaps including Kelly 116, drill pipe 118, and BHA 120) can be rotated by the rotary table 110. In addition to, or alternatively, BHA 120 can also be rotated by a motor (e.g., a mud motor) that is located down hole. The drill collars 122 can be used to add weight to the drill bit 126. The drill collars 122 can also operate to stiffen the bottom hole assembly 120, allowing the bottom hole assembly 120 to transfer the added weight to the drill bit 126, and in turn, to assist the drill bit 126 in penetrating the surface 104 and subsurface formations 114. While the drilling operation is underway, sensors 128 may take measurements regarding one or more parameters associated with the formation 114 surrounding the wellbore. The type of sensors included in sensors 128 are not limited to any particular type of sensor, and for example may include any combination of electromagnetic sensors, acoustic sensors, ultrasound sensors, nuclear sensors, magnetic resonance sensors and the like. Data collected by sensors 128 may include data associated with measurements taken while the sensors are being rotated with the drill string 108 and/or while the sensor are stationary while the drill string is not being rotated. The data collected from the sensors 128 may include data used to generate images associated with one or more parameters of the formation surrounding borehole 112 up to and including 360 degrees around the borehole and along at least some vertical length of the borehole. Data collected by the operation of sensors 128 may be further processed to align data images using any of the methods and techniques described herein, and any equivalents thereof.

During drilling operations, a mud pump 132 can pump drilling fluid (sometimes known by those of ordinary skill in the art as "drilling mud") from a mud pit 134 through a hose 136 into the drill pipe 118 and down to the drill bit 126. The drilling fluid can flow out from the drill bit 126 and be returned to the surface 104 through an annular area 140 between the drill pipe 118 and the sides of borehole 112. The drilling fluid can then be returned to the mud pit 134, where such fluid is filtered. In some embodiments, the drilling fluid can be used to cool the drill bit 126, as well as to provide lubrication for the drill bit 126 during drilling operations. Additionally, the drilling fluid can be used to remove subsurface formation 114 cuttings created by operating the drill bit 126.

Figure 2:
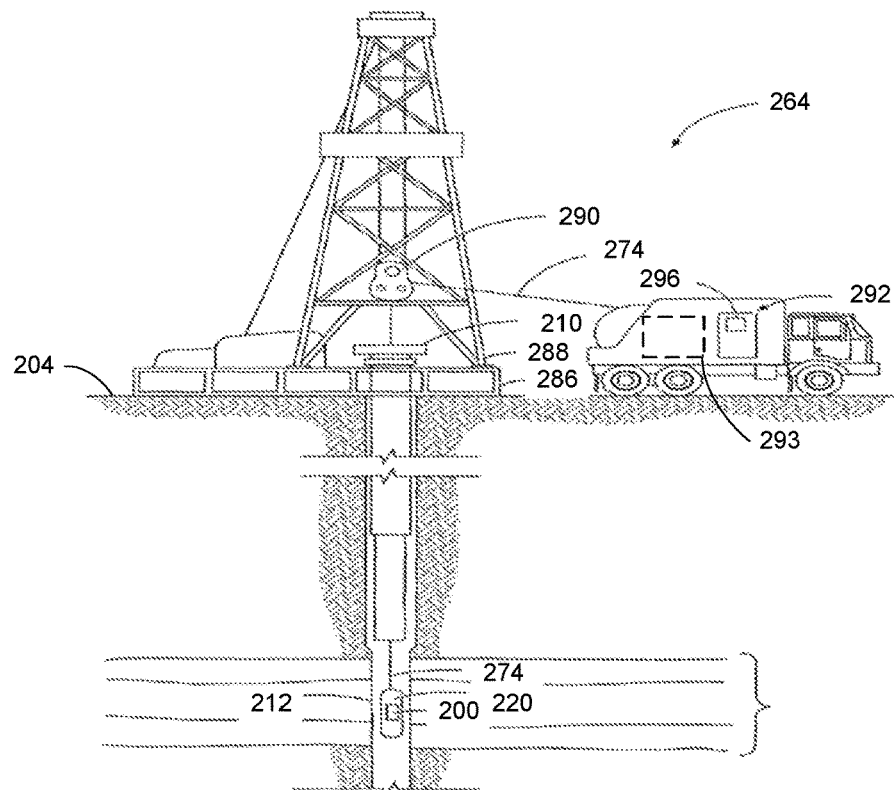
FIG. 2 is an elevation view of a logging system.

FIG. 2 depicts a logging system 264 according to some embodiments. The system 264 can comprise a logging tool body 220, as part of a logging operation in a borehole 212, that includes the high-resolution imaging tool 200, which may include a plurality of sensors used to acquire signals and generate measurements used to generate sub-images. The borehole 212 can include casing and cement along at least some portion of the borehole, and may be an open hole (i.e. without casing or cement) along at least some other portion or portions of the borehole.

System 264 incudes a drilling platform 286 equipped with a derrick 288 that supports a hoist 290. Here it is assumed that the drill string has been removed from the borehole 212 to allow the logging tool body 220, such as a probe or sonde with the high-resolution imaging tool 200, to be passed into the borehole 212 by a conveyance 274 (e.g., wireline, slickline, coiled tubing, pipe, downhole tractor etc.). Typically, the logging tool body 220 is lowered to the bottom of the region of interest and subsequently pulled upward. In various embodiments, power used to operate tool 200 may be provided from a power source 293, such as a battery or an electrical generator, located at surface 204. In various embodiments, some or all of the power used to operate tool 200 may be provided by a power source, such as a battery (not specifically shown in FIG. 2) located for example within the tool body 220.

During the downward and/or upward passage, at a series of depths, the high-resolution imaging tool 200 can acquire measurements to generate images of the subsurface formation. The data (e.g., received data from the acquired measurements) can be communicated to a surface logging facility (e.g., workstation 292) through conveyance 274 for processing, analysis, and/or storage. The workstation 292 can be provided with electronic equipment, such as one or more computer processors, computer memory, and communications modem to provide communications between tool 200 and workstation 292. Workstation 292 may include one or more processor as illustrated and described below with respect to FIG. 22 and computing system 2200, or any variations thereof. Workstation 292 may include various types of signal processing equipment, firmware, and/or software configured to perform signal processing on signals and/or data transmitted from to tool 200 to workstation 292, including any combination of the operations described below. The workstation 292 can have a controller 296 that is coupled to the high-resolution imaging tool 200 through the conveyance 274 or telemetry in order to receive data from the high-resolution imaging tool 200. The communications format(s) used to provide communications between tool 200 and workstation 292 are not limited to any particular format or formats, and may include any communication format or formats appropriate for providing communications between the tool 200 and workstation 292. A non-limiting example of a communications format that may be utilized by system 264 a form of a discrete multi-tone ("DMT") modulation technique for downhole telemetry.

In various embodiments, tool 200 may include one or more computing systems including one or more computer processors and computer memory configured to receive and process signals associated with the acquired measurements being made by tool 200, and to store data associated with the received signals for retrieval, and in some embodiments further processing, at a later time according to any of the embodiments described herein, and any equivalents thereof.

Figure 3B:
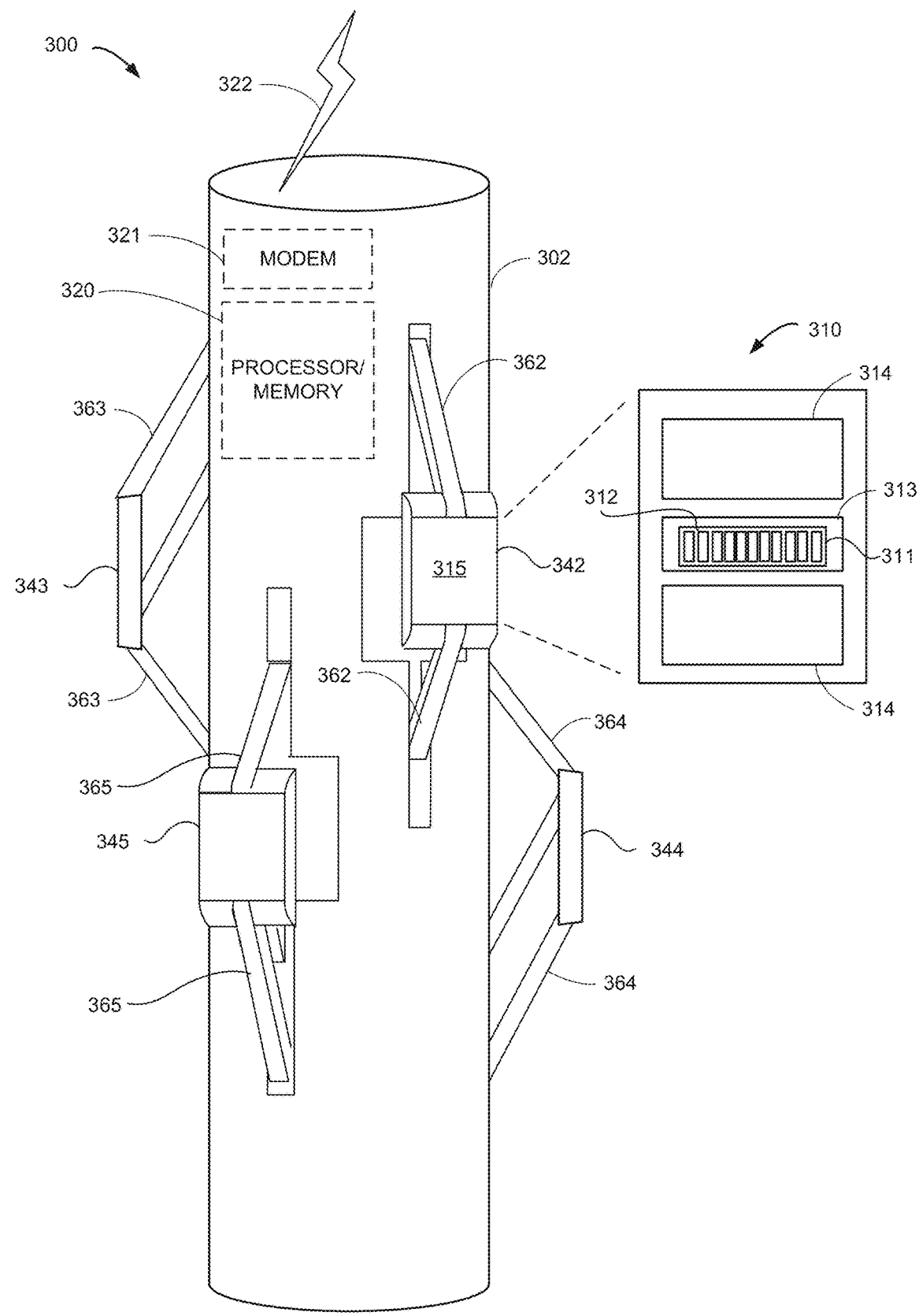
FIG. 3B depicts an isometric view of a downhole tool with multiple sensors on extendible pads.

FIG. 3B depicts an isometric view of a downhole tool with multiple sensors on extendible pads. In various embodiments, tool 300 is included in or comprises tool 200 utilized by the logging system 264 as illustrated and described above with respect to FIG. 2. Referring again to FIG. 3B, the downhole tool 300 includes a plurality of pads, such as pads 342, 343, 344, and 345. Pads 342, 343, 344, and 345 are supported by a corresponding arm configuration 362, 363, 364, and 365, respectively, that extend from a central tool body 302 of the downhole tool 300. While shown has having four pads, other embodiments of downhole tool 300 can have any number of pads equal to or greater than two, including but not limited to six pad and eight pad configurations. In some embodiments, downhole tool 300 can have an evenly distributed number of pads to maintain the central tool body 302 of the tool near the borehole central axis. The number of pads may vary based on the size of the pad and the comparative size of the borehole.

In some embodiments, all of the pads can be aligned on the same circumference of the tool. Alternatively, as shown in FIG. 3B, the pads may be split into multiple sets, each set being aligned on a different tool circumference. For example, pads 342 and 343 can be aligned on a first tool circumference, while pads 344 and 345 can be aligned on a second circumference. In some embodiments, each set of pads can comprise any number of pads and can be angularly offset in a radial direction from each of the other sets to provide more complete coverage of the borehole wall. The central tool body 302 can be equipped with one or more sensors for acquiring measurements. In addition, each of the pads 342, 343, 344, and 345 can be equipped with their own set of sensors for acquiring measurements. These measurements taken using these sensors can be used directly as the values that represent portions of an image, which may be referred to as a sub-image, and/or may be used as part of calculations that generate values representing portions of an image.

Sensor 310 is an example of a sensor arrangement that may be included in one or more of pads 342, 343, 344, and 345, for example as illustrated in FIG. 3B as part of pad 342. Sensor 310 includes a button array 311 including a plurality of buttons 312, encircled by a guard 313. Sensor 310 also incudes one or more return electrodes 314. The number of buttons 312 included in button array 311 is not limited to any particular number of buttons, and in some embodiments incudes twenty-four buttons. Pad 342 may also be covered with a metal plate 315 called the "housing." This housing is connected with a mechanical arm to the mandrel or body 302 of the tool, so that arm 362 may open and swivel to maintain a good contact with the formation and minimize the mud effect. An insulating material such as ceramic may be used to fill the remaining portions of the pad.

In operation, a voltage difference between the button array 311 and the return electrode(s) 314 is applied, which causes currents to be emitted from the button array into the mud and the formation in the proximity of pad 342. Guard electrode 313 around the button array 311 may be at the same voltage potential with the button array to help focus most of the current into the formation radially. Most of the transmitted current is returned to the return electrodes 314, although some portions of it may return through housing and the mandrel. By measuring the voltage between the buttons and the return and dividing it by the current transmitted through each button of the button array, an impedance value can be determined for each button. Impedances determined based on the currents provided from buttons 312 and returned through electrodes 314 and/or housing 315 may correspond to and have contributions from both mud and the formation in proximity to pad 342, and reflect one or more characteristics associated with the mud and/or the formation in the proximity of the pad. The collected data related to the impedance measurements may be used to generate a sub-image strip associated with pad 342 and the borehole and formation sensed using pad 342 as part of a logging operation.

For example, the row of buttons 312 may provide a horizontal strip of data associated with a sub-image strip, wherein by moving the pad 342, and thus moving button array 311 in a direction along a longitudinal axis of the borehole, a series of horizontal strips may be generated based on impedance measurements to generate a sub-image strip for a portion of the borehole passed along in proximity to pad 342. It would be understood that each of pads 343, 344, 345, and any other pads included in tool 300, may perform similar measurements, wherein each pad may provide data associated with a measurements taken using a button array and return electrodes/housing to produce a respective sub-image strip, as further illustrated and described below. In various embodiments, tool 300 may include a computing device 320 that includes one or more processors and computer memory, which may be configured to receive electrical signals from the sensor 310 and any other sensors located within or coupled to tool 300, and to process and/or store the received data. In some embodiments, the raw data from sensor 310 and/or processed data may be transmitted (illustratively shown as lightning bolt 322), for example in real time, by modem 321 to another computing system, such as workstation 292 as illustrated and described with respect to FIG. 2.

As used herein, the term "pad" refers to any potion of a downhole tool that includes one or more sensors positioned within or physically coupled to a portion of the downhole tool. Pads may be non-extendible pads, and/or may be configured to be mechanically extendible and retractable relative to an outer surface of the tool body. A given pad may include a single sensor device or a plurality of sensor devices. Pads may be incorporated into a BHA, for example as illustrated and described with respect to FIGS. 1 and 3A, and/or may be incorporated on logging tools, such as tool body 220 as illustrated and described with respect to FIGS. 2 and 3B. The flowcharts described below are provided to aid in understanding the illustrations and are not to be used to limit scope of the claims. The flowcharts depict example operations that can vary within the scope of the claims. Additional operations can be performed; fewer operations can be performed; the operations can be performed in parallel; and the operations can be performed in a different order. It will be understood that each block of the flowchart illustrations and/or block diagrams, and combinations of blocks in the flowchart illustrations and/or block diagrams, can be implemented by program code. The program code can be provided to a processor of a general purpose computer, special purpose computer, or other programmable machine or apparatus. The flowcharts below include operations that can be performed by hardware, software, firmware, or a combination thereof. For example, the operations can be performed by a processor executing program code or instructions.

Figure 4:
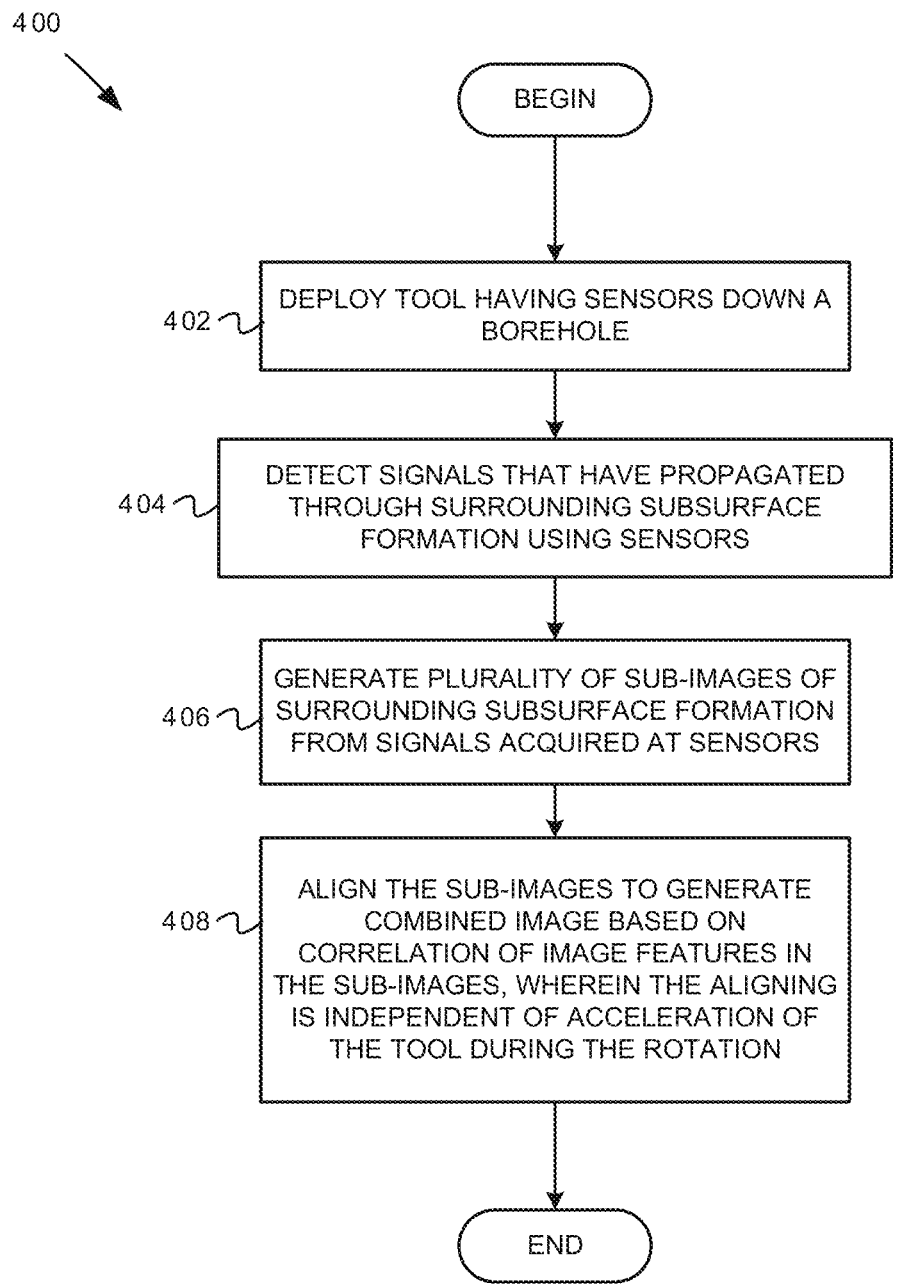
FIG. 4 is a flowchart of operations for alignment of sub-images of a subsurface formation.

FIG. 4 is a flowchart of operations for alignment of sub-images of a subsurface formation. The flowchart 400 depicts operations for performing sub-image alignment using a system that includes one or more processors. For example, operations of the flowchart 400 can be performed using a system similar to the computer device 2200 shown in FIG. 22. Operations of the flowchart 400 begin at block 402.

At block 402, a tool having multiple sensors is deployed down a borehole. The sensors can be of one or more types, such as acoustic sensors, electrodes, electromagnetic wave sensors, etc. In some embodiments, the tool may be lowered as a part of a drilling assembly. For example, with reference to FIG. 1, the tool can be lowered as part of the BHA 120. Or, with reference to FIG. 2, the tool can be lowered as a part of the logging tool body 220.

At block 404, one or more signals that have propagated through the surrounding subsurface formation are detected by the multiple sensors in the tool. In some embodiments, the signals may originate from an electrode and/or transmitter from the tool. For example, with reference to FIG. 2, sensors in the logging tool body 220 can receive signals propagated from transmitters in the logging tool body 220. Alternatively, the signals can originate at the earth's surface, e.g. from a device such as an acoustic transmitter, an electric transmitter, an electromagnetic wave transmitter, etc.

At block 406, a device or system can generate a plurality of sub-images of the surrounding subsurface formation from signals acquired at each of the multiple sensors. The device or system can generate each of the plurality of sub-images using various seismic inversion methods. For example, the device or system can generate a sub-image using seismic inversion methods based on electromagnetic signals measured by the multiple sensors. Specific examples of geological inversion methods can include pre-stack seismic resolution inversion, pre-stack log-detail inversion, post-stack seismic resolution inversion, geostatistical inversion, etc.

At block 408, the device or system perform alignment operations on the sub-images to create a combined image based on a correlation of image features in the sub-images. The alignment can be independent of any measurements corresponding to acceleration and/or displacement of the tool during the motion. As further described below, alignment of the sub-images can include a global, window-based alignment and zoned, edge-based alignment. For example, with reference to FIG. 5 and FIG. 10, the device or system can perform operations of the flowchart 500 and/or flowchart 1000 to align sub-images to generate a combined formation image.

Figure 5:
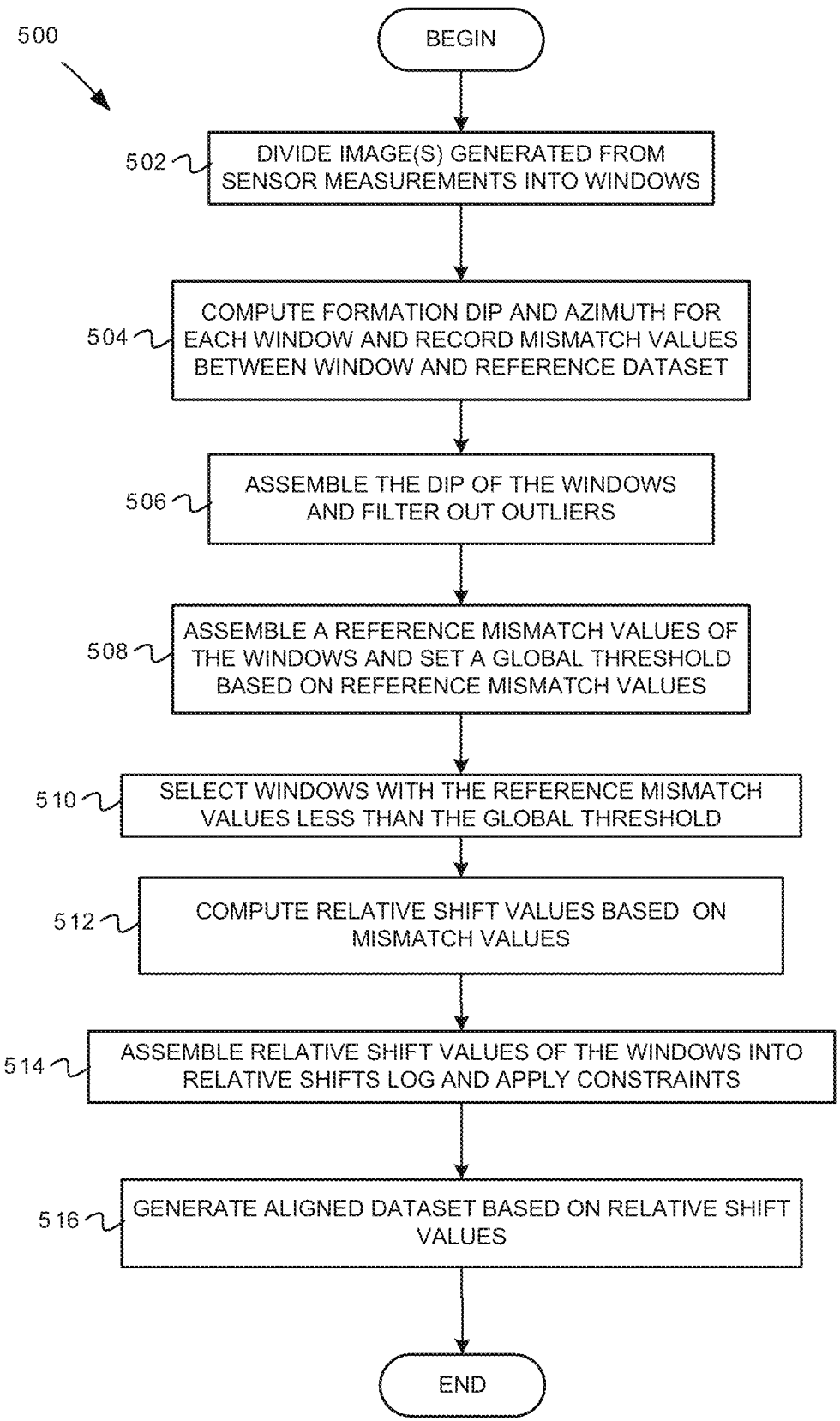
FIG. 5 is a flowchart of operations for global, window-based alignment of images.

FIG. 5 is a flowchart of operations for global, window-based alignment of images. The flowchart 500 depicts operations for performing global, window-based image alignment using a system that includes one or more processor. For example, operations of the flowchart 500 can be performed using a system similar to the computer device 2200 shown in FIG. 22. Operations of the flowchart 500 can begin at block 502.

At block 502, one or more images generated from sensor measurements are divided into windows. In some embodiments, the sensor measurements can be based on the signals detected by the sensors, wherein the signals have traveled through a formation. In some embodiments, the windows can be spaced, including substantially uniformly-spaced to cover an image representing an entire 360-degree rotation around a borehole, wherein the spacing can be measured in length units and/or angular units. For example, the windows can be uniformly spaced at angular intervals of 30 degrees. Alternatively, or in addition, the windows can be offset from image edges, wherein an image edge represents an edge of measurement using one or more sensors. For example, a first window can be +10 degrees offset from an image edge and a second window can be −10 degrees offset from the image edge. In some embodiments, the windows can overlap to form a contiguous image. For example, a five-foot image can be split into a set of three overlapping two-foot windows, wherein two of the windows each overlap the remaining window by one-half foot.

At block 504, the device or system can perform operations to compute a formation dip and/or an azimuth for each window and perform operations to record any corresponding mismatch value between the window and a reference dataset. In some embodiments, the reference dataset can be a combined image formed from a subset of sensors on a tool. For example, a tool can include a set of sensors, wherein each sensor is part of a set of numerically-indexed pads that are either odd-numbered pads or even-numbered pads, wherein the reference dataset is a combined image formed from the measurements of sensors on all of the odd-numbered pads. Alternatively, the reference dataset can be represented based on a combined image formed from the measurements of sensors on all of the even-numbered pads, or on some designated set of reference pads that have a predefined orientation with respect to other sensor pads that are normally used to gather sensor data to create images.

The mismatch value for each of the windows can be computed as being equal to or based on a difference between measurement values in a window and measurement values in the reference dataset along a principal direction, wherein the principal direction can be defined by the formation dip and/or azimuth within each window. For example, the mismatch value can be calculated as a sum of the squares of the differences between a sub-image feature line and a reference dataset feature line, wherein a first axis of each feature line is a principle direction that is parallel with the vertical line of a borehole and a second axis of each feature line is a principle direction that is perpendicular to the vertical axis of the borehole. Alternatively, the mismatch value can be computed as a function of data consistency, wherein data consistency can be numerically defined based on a cross-correlation, cross-covariance, or other calculation based on the sub-image and the reference dataset. In addition, the device or system can display a mismatch curve between the sub-image and the reference dataset for quality control and/or further verification.

At block 506, the device or system assembles a dip of the windows and also filters outliers. The device or system can assemble the dip of the windows by arranging the windows based on their spatial positions so that a larger contiguous image can be formed from each of the windows. Outliers can include measurements associated with a mismatch value above a mismatch threshold, wherein measurements having a mismatch value above the mismatch threshold indicates poor image quality. In addition, outliers can include crossing sinusoids between a reference dataset and a window-specific dataset, wherein the sinusoids are a set of measurements based on sinusoidal signals that form a sinusoidal wave indicative of a formation dip, and wherein crossing sinusoids can also indicate poor image quality. In some embodiments, the mismatch threshold can be used to determine an alignment accuracy and/or confidence interval in an aligned image.

At block 508, the device or system performs operations to assemble a reference mismatch value based on the windows and operations to set a global threshold based on the reference mismatch value. In some embodiments, the device or system can assemble the reference mismatch of the windows by combining each of the mismatch values corresponding to their respective windows into a single dataset. For example, the device or system combine the mismatch values of a signal measurements from a set of sensors into a data array that associates a particular depth and sensor with a mismatch value. Alternatively, or in addition, the device or system can generate a dataset comprising a set of reference index values, wherein each of the reference index values correspond to a window-specific dataset comprising the mismatch values for a set of sensors.

In some embodiments, the global threshold can be a function using the reference mismatch values as an input, wherein mismatch values above the global threshold indicate a poor quality image and can be filtered out from image-based alignment operations. For example, for a particular depth, if the mismatch values are 0.1, 0.25, and 0.45 of a maximum measured mismatch value, the global threshold can be selected as 0.25 of the maximum measured mismatch value. Alternatively, the global threshold can be based on the result of a statistical operation based on the reference mismatch. For example, the global threshold can be a mean, root mean square, or mode value of the reference mismatch values.

At block 510, the device or system selects windows having a mismatch value that satisfies the global threshold for image alignment. In some embodiments, the device or system can select windows based on the mismatch value being less than or equal to the global threshold. For example, if the global threshold is 0.25 of the maximum reference mismatch value, the device or system can select one or more windows having a corresponding mismatch value that is less than or equal to 0.25 of the maximum reference mismatch value.

At block 512, the device or system determines relative shift values for each window based on the mismatch values. In some embodiments, the device or system can determine relative shift values by determining shift values that would reduce a global mismatch value. For example, a global mismatch value can be a mean average calculated from the mismatch values of the selected windows described above for block 510. Alternatively, the global mismatch value can be based on a sum of squares, a median value, a mean average value, a covariance value, a cross-correlation value, etc. over all of the available mismatch values. The system can then use one of various numerical optimization methods to reduce the global mismatch value by altering the relative shift values for the windows. By shifting a window by the relative shift, the measurements corresponding to the window can be brought in closer alignment to the reference dataset, which in turn can reduce the mismatch values for each of the corresponding windows. For example, the system can use Newton's method, the Secant method, the Bisection method, etc. to change the relative shift values corresponding to each window with the objective of minimizing the global mismatch value. In addition, the device or system can apply a regularization value that increases with respect to increasing relative shift values, wherein an increasing regularization value increases the calculated mismatch value. For example, a mismatch value can be equal to "$M_0 * s^2$", wherein "s" represents relative shift, "$s^2$" is a regularization value, and $M_0$ is an initial mismatch value that is independent of the regularization value.

At block 514, the device or system assembles the relative shift values of the windows into a relative shifts log and applies physical constraints on the relative shifts log. Physical constraints can include a depth monotonicity constraint, wherein applying the depth monotonicity constraint preserves the order of features with respect to depth in the other dataset. The system or device can apply the depth monotonicity constraint by changing one or more of the computed relative shifts. For example, the system can apply the depth monotonicity constraint by reducing computed relative shift values at certain depth points to make sure that shifted features at those points fall in monotonic order with other features at adjacent depth points.

At block 516, the device or system generates an aligned dataset based on the relative shift values and interpolating the relative shift values across windows. In some embodiments, the device or system can modify the spatial coordinates corresponding to an image by the relative shift values for each window. Alternatively, the device or system can generate a new image having the spatial coordinates shifted by the relative shift values for each window. If there is a boundary region between windows, the device or system can use an interpolation method to align a section of each window that borders the boundary region. For example, if a relative shift value of a first window on one side of the boundary region is 1.0 inch and a relative shift value of a second window on another side of the boundary region is 2.0 inches, the device or system can interpolate a relative shift value of the boundary region to be 1.5 inches and shift the spatial coordinates corresponding to signal measurements in the boundary region of each window by 1.5 inches.

To help illustrate operations of the flowchart 500, an example of operations to perform window-based image alignment is now described in reference to FIGS. 6-FIG. 9. With reference to FIG. 3B, the tool used can be the downhole tool 300. In this example, the odd pads are the reference pads.

FIG. 6 includes an example image 600 before alignment. Each of the sub-images 601, 602, 603, 604, 605, and 606 are sub-images representing measurements acquired by individual sensors on a tool, wherein the sensors can be azimuthally and/or axially distributed along the tool. The sub-images 601, 602, 603, 604, 605, and 606 are shown to be misaligned and unordered in FIG. 6. As shown below, each of the sub-images 601, 602, 603, 604, 605, and 606 can be split into windows and aligned.

FIG. 7 depicts an aligned image generated using a global, window-based alignment based on the image depicted in FIG. 6. With respect to FIG. 6 and FIG. 5, the sub-images 601, 602, 603, 604, 605, and 606 can be aligned using operations of the flowchart 500. Specifically, the resulting sub-images 701, 702, 703, 704, 705, and 706 may comprise data from the sub-images 601, 602, 603, 604, 605, and 606, respectively, that has been separated into windows and aligned. For example, the image data represented by the aligned sub-images 702 may have been split into a set of windows, wherein one of the set of resulting aligned windows can be represented by the image in the box 721. In some embodiments, sine waves (depicted in FIG. 7 as white lines across the image) can be overlaid over the windows of the aligned image 700. The sine waves can be associated with formation dips located at a physical location corresponding with the centers of one or more of the windows. Each of the windows can be aligned with respect to each other to achieve a minimum mismatch value between adjacent windows.

Figure 8:
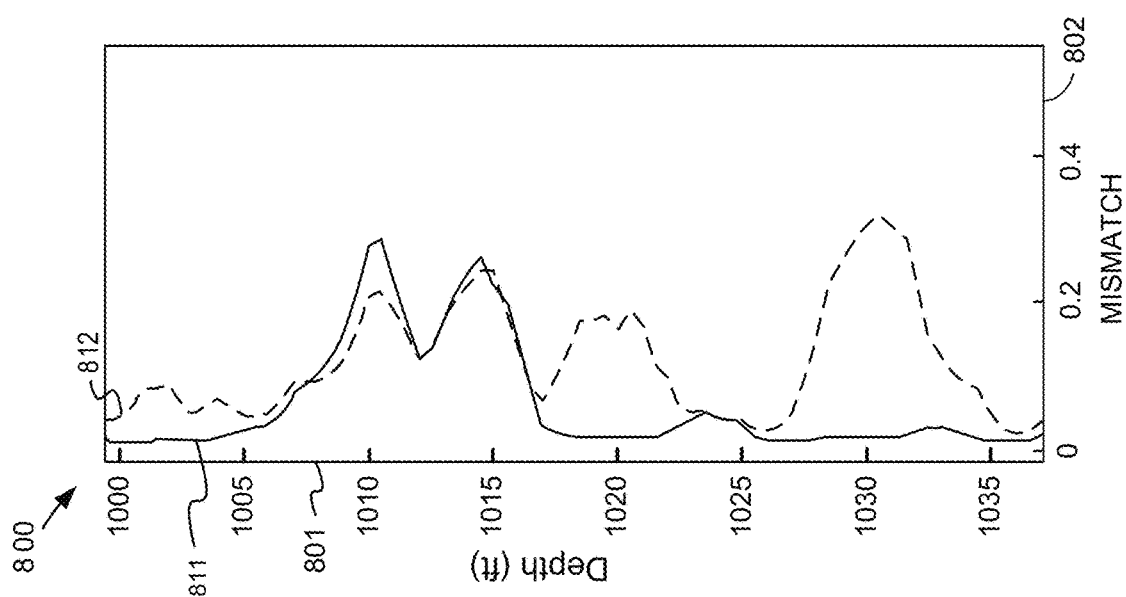
FIG. 8 includes a graph of the amount of measurement mismatch between sensor measurements on the reference pads and non-reference pads, and the residual measurement mismatch across all pads after alignment.

FIG. 8 includes a graph of the amount of measurement mismatch between sensor measurements on the reference pads and non-reference pads, and the residual measurement mismatch across all pads after alignment. FIG. 8 includes the graph 800 having a horizontal axis 802 and a vertical axis 801. The horizontal axis 802 represents average mismatch values normalized with respect to a pre-determined value. The vertical axis 801 represents a depth of measurement in feet. In some embodiments, the mismatch values can be modified/corrected based on one or more formation dip values. For example, if the formation dip for a first window shows a 5 degree shift from the axis of the wellbore and the formation dip for a second window shows a 6 degree shift from the axis of the wellbore, the values of the first window can be rotated by 1 degree via a rotation transformation axis. The graph 800 also includes a first trendline 811 and a second trendline 812. The first trendline 811 represents a reference pad mismatch. The second trendline 812 represents the average mismatch value of all the other pads. As seen by comparing the first trendline 811 and the second trendline 812, the mismatch values differ along the depth of measurement shown in the graph 800.

Figure 9:
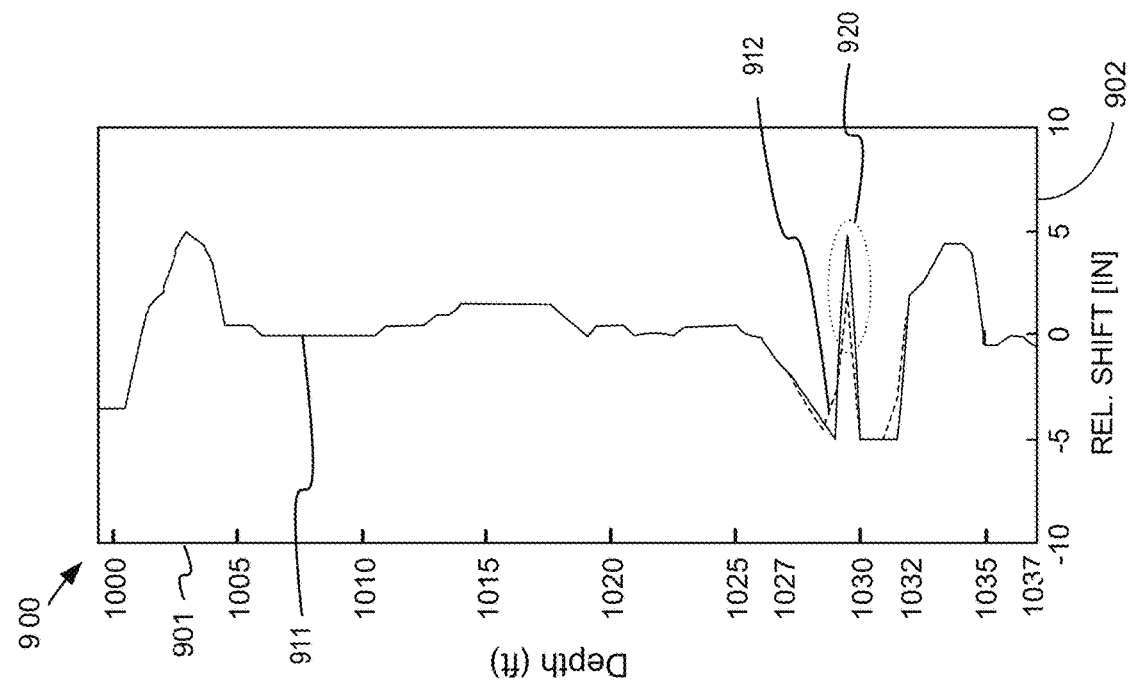
FIG. 9 includes a graph showing the relative shift used to align measurements from a first set of sensors to their corresponding reference dataset for each of a set of windows.

FIG. 9 includes a graph showing the relative shift used to align measurements from a first set of sensors to their corresponding reference dataset for each of a set of windows. The graph 900 has a horizontal axis 902 and a vertical axis 901. The horizontal axis 902 represents a relative shift in values of inches. The vertical axis 901 represents a depth of measurement in units of feet. The graph 900 also includes an unconstrained relative shift log 911 and a constrained relative shift log 912. The unconstrained relative shift log 911 can be formed from interpolating discrete relative shifts between different windows. With respect to FIG. 5, the constrained relative shift log 912 represents the relative shift applied to a window in order to achieve a reduced mismatch when the shift is constrained based on operations similar to or identical to those described for block 514.

The unconstrained relative shift log 911 and the constrained relative shift log 912 overlap across the depth range from the upper shown depth limit of 1000 feet to the depth 1027 feet and the depth range from the depth of 1032 feet to the lower shown depth limit of 1037 feet. As shown in the graph 900, the unconstrained relative shift log 911 differs from the constrained relative shift log 912 in the depth range between the depth of 1025 feet and the depth of 1032 feet. In general, the unconstrained relative shift log 911 shows a greater peak shift in a region 920 compared to the corresponding shift peak of the constrained relative shift log 912 in the same region 920. In some embodiments, with reference to FIG. 5, a device or system can generate the unconstrained shift log represented by the constrained relative shift log 912 and then apply a monotonicity constraint as described for block 514. As shown in the graph 900, by constraining the peak, the relative shift between windows can be decreased.

Figure 10:
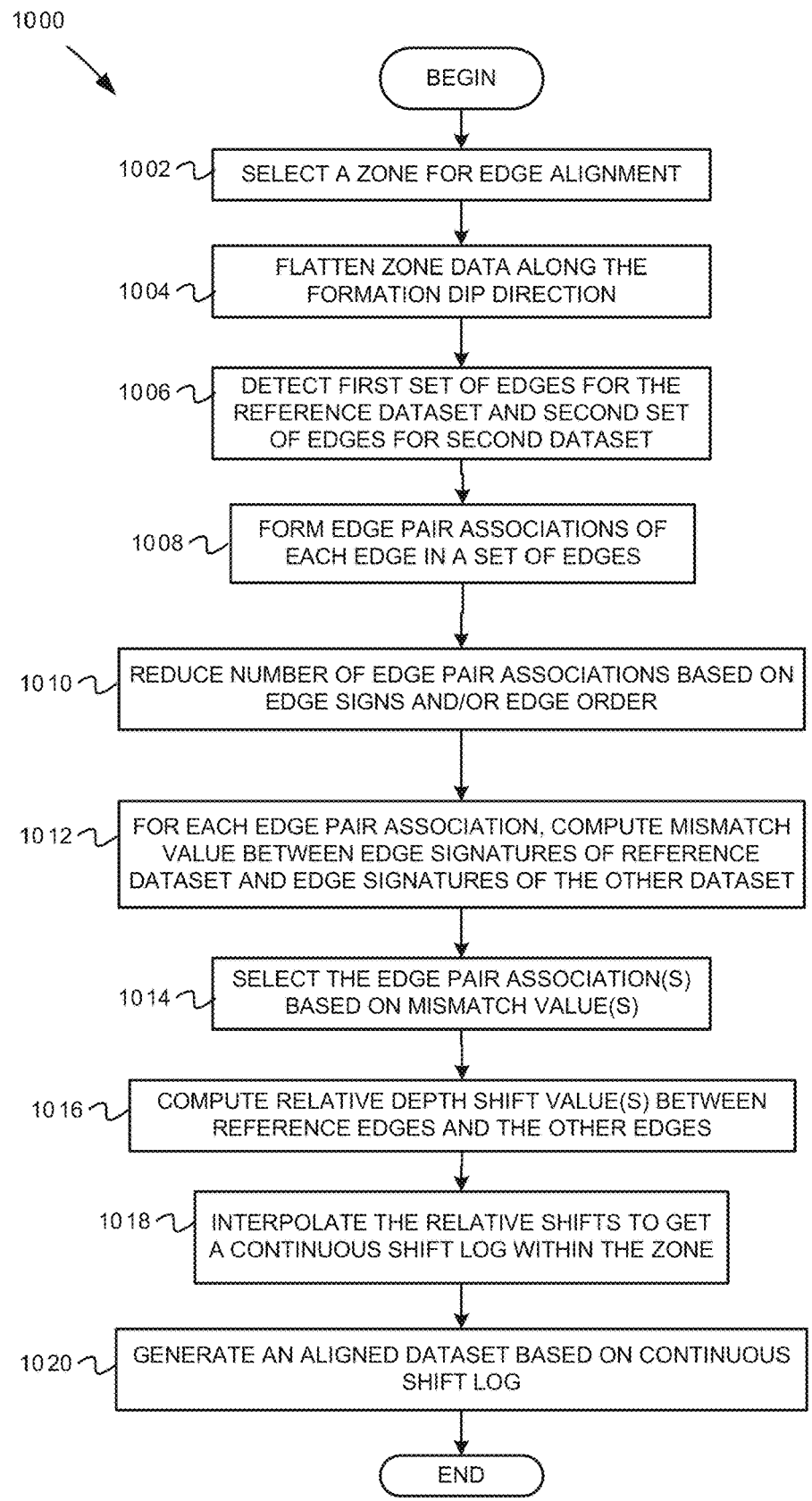
FIG. 10 is a flowchart of operations for zoned, edge-based alignment.

FIG. 10 is a flowchart of operations for zoned, edge-based alignment. The flowchart 1000 describes operations for performing zoned, edge-based alignment of images using a system that includes a processor. For example, operations of the flowchart 1000 can be performed using a system similar to the computer device 2200 shown in FIG. 22. Operations of the flowchart 1000 can begin at block 1002.

At block 1002, a zone for edge alignment is selected. Edges can be defined as depth values associated with a significant ("sharp") change in signal measurement values of an image across the depth, wherein the determination that a particular measurement value change is significant can be based on an edge threshold value. An edge can indicate one or more various geological/physical features of the formation, such as bed boundaries, fractures, etc. A zone can be a region in an image or sub-image that can be either the same as or different from a window as described above. The device or system can select zones for edge alignment based previous visual or automated inspections of an image and/or sub-image.

Alternatively, or in addition, the device or system can select zones for edge alignment based on the application of a global, window-based alignment as described above, wherein the device or system selects zones based on one or more selection criteria. For example, the selection criteria can include a criterion that the relative shift value for a window generated during a global, window-based alignment operation as described above is greater than a zone selection shift threshold. The selection criteria can also include a criterion based on whether a mismatch value for a window is greater than a zone selection mismatch threshold, wherein the window mismatch values can be reported in or converted to the same units as the zone selection mismatch threshold.

At block 1004, the device or system flattens values in one or more zones along a principal direction. In some embodiments, the principal direction can be a formation dip direction, and the device or system can flatten zone data along the formation dip direction. Flattening values in a zone can mean applying a transformation such as conformal mapping from un-flattened image values to flattened values in a zone, which can modify the directions of features within one or more zones. Flattening values in a zone can increase the efficiency of operations to perform edge detection and mismatch computation, as further described below. Furthermore, in some embodiments, the device or system can determine an average log of measurements based on the flattened values in the zones and use the average log of measurements for edge detection and mismatch computation as described below.

At block 1006, the device or system detects a first set of edges for the reference dataset and a second set of edges for the second dataset. In some embodiments, both the reference dataset and the second dataset can include data the same as or at least based on the images having flattened zones as described above at block 1006. The reference dataset can be pre-selected from a first set of sensors, and the second dataset can be based on measurements from sensors not in this first set of sensors. The device or system can detect edges using one or more various the edge detection algorithms such as an algorithm based on zero crossings of mean subtracted data, inflection points, Laplacian of a Gaussian filter, etc. For example, the device or system can detect edges in reference dataset using a Gaussian filter, wherein the reference dataset is formed from sub-images having values equal to measurements acquired from sensors on odd-numbered pads on a tool. In the same example, the device or system can detect edges in a second dataset using the Gaussian filter, wherein the second dataset is formed from sub-images having values equal to measurements acquired from sensors on even-numbered pads on a tool.

At block 1008, the device or system forms edge pair associations of each edge in the set. In some embodiments, an edge pair association can link edges from different sub-images together. In some embodiments, the different sub-images can have different numbers of associated edges corresponding to each sub-image, wherein an edge from a first sub-image can be associated to an edge of a different sub-image via an edge pair association even if the different sub-image has more associated edges than the first sub-image. For example, if a first number of edges are in a first sub-image and a second number of edges are in a second sub-image, an edge from the first number of edges can be associated to an edge in the second number of edges even if the total number of edges in the first number of edges is less than the total number of edges in the second number of edges.

At block 1010, the device or system reduces the number of edge pair associations based on edge signs and/or edge order. In some embodiments, an unprocessed edge pair association can have a sign change ("polarity change") between its pair of edges, wherein the first edge of the edge pair association is at a first sign and the second edge of the edge pair association is at a second sign. The device or system can determine that a sign changes between the first edge of the edge pair association and the second edge of the edge pair association. The system can then reduce the number of edges by deleting the corresponding edge pair association or otherwise deleting a tag identifying the corresponding edge pair association. In addition, or alternatively, the device or system can filter out edge pair associations that are not sorted in order. For example, if a first edge pair association associates a first edge at a depth 1 foot in a first sub-image with a second edge at a depth of 1.1 feet in a second sub-image, and a second edge pair association associates a third edge at a depth 1.5 feet in the first sub-image with a fourth edge at a depth of 0.1 feet in a second sub-image, the device or system can filter out the second edge pair association for being out of order.

At block 1012, the mismatch values between edge signatures of the reference dataset and edge signatures of the second dataset is computed for each edge pair association. Edge signatures can be computed as the union (or average value) of the change in the measurement values of an image across each one of the edges within a given edge pair association. Alternatively, the edge signature of the reference dataset can be the reference dataset itself, and the edge signature of the second dataset can be the interpolated version of the other dataset based on the edge-to-edge association within the given edge pair association. A mismatch value can then be based on the difference between the edge signature of the reference dataset and the edge signature of the second dataset.

At block 1014, the device or system selects one or more edge pair associations based on one or more mismatch values. In some embodiments, the device or system can select the one or more edge pair associations based on which of the associations in a set of edge pair associations have the least mismatch values. For example, between a set of edge pair associations having normalized mismatch values of 0.3, 0.5, and 0.12, a device or system limited to selecting one edge pair association can select the edge pair association having the normalized mismatch value of 0.12.

At block 1016, the device or system can compute one or more relative shift values between reference edges and the other edges based on an edge pair association having a least mismatch value. In some embodiments, the edge pair association can be one of the selected edge pair association described above for block 1014. The device or system can compute the relative shift by determining the depth difference between the edge of the reference dataset and the edge of the second dataset, wherein both edges are linked by one of the edge pair associations described above. For example, if a first edge of an edge pair association is at a depth of 10 feet and a second edge of an edge pair association is at a depth of 11 feet, the total change can be 1 foot.

At block 1018, the device or system generates a continuous shift log within a selected zone by interpolating the relative shifts. The device or system can generate the continuous shift log by interpolating the relative shift values determined at block 616. With respect to FIG. 5, the device or system can interpolate the relative shift values using an operation that is similar to or identical to as one of those described for block 516.

At block 1020, the device or system generates an aligned dataset based on the continuous shift log. In some embodiments, the device or system can generate the aligned dataset by comparing values in the sub-image corresponding with a window in an unflattened sub-image to reduce mismatch with the continuous shift log. For example, the device or system can shift each of the edges in one or more sub-images by their corresponding values in the continuous shift log to generate an aligned dataset from the sub-images.

To help illustrate operations of the flowchart 1000, an example of edge-based image alignment applied to a zone is now described in reference to FIGS. 11-15.

FIG. 11 includes a second example of an unaligned image 1100. Each of the sub-images 1101, 1102, 1103, 1104, 1105, and 1106 in image 1100 represents measurements made by a different sensor on a tool. Many of the sub-images 1101, 1102, 1103, 1104, 1105, and 1106 are shown to be misaligned and unordered. Each of the sub-images 1101, 1102, 1103, 1104, 1105, and 1106 are split into windows such as the window 1121, and the sine waves associated with formation dips are depicted at the center depth of each window.

FIG. 12 includes the unaligned image of FIG. 11 that has been flattened by conformal mapping along a formation dip direction. FIG. 12 includes a flattened image 1200. With respect to FIG. 10 and FIG. 11, a device or system can use operations described for block 1004 of the flowchart 1000 to flatten conformal mapping along the dip directions for the data represented by the sub-images 1201, 1202, 1203, 1204, 1205, and 1206. Each of the ovals in the first dashed box 1221 and the second dashed box 1222 indicate an edge location based on measurements from sensors on both the odd and the even pads, respectively.

Figures 13, 14:
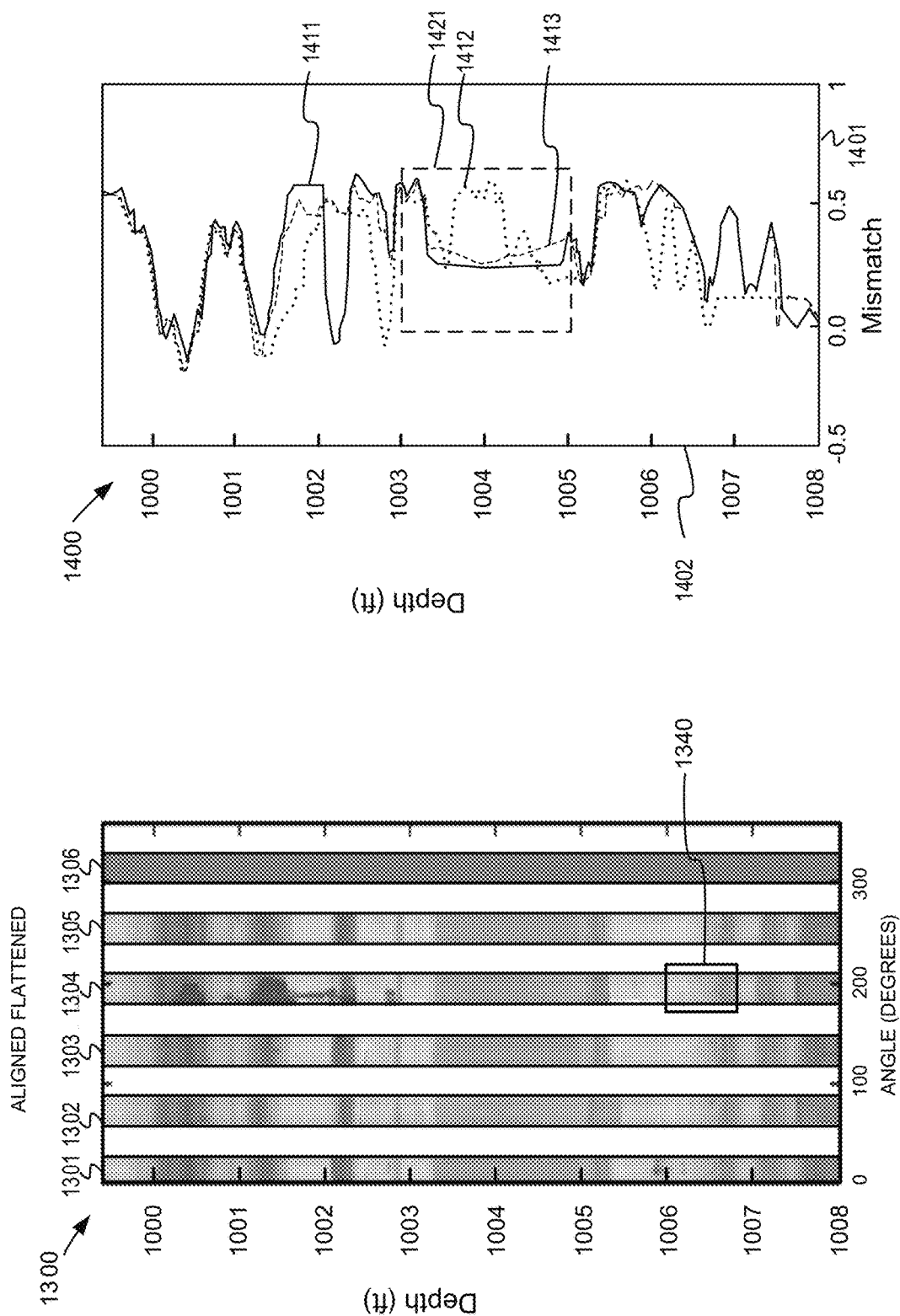
FIG. 13 includes the flattened image of FIG. 12, after an alignment operation.
FIG. 14 includes a graph of the mean average of measurements in a reference dataset, the mean average of measurements from a second set of sensors before alignment, and the mean average of measurements from a second set of sensors after alignment.

FIG. 13 includes the flattened image of FIG. 12, after an alignment operation. FIG. 13 includes an aligned, flattened image 1300. With respect to FIG. 10 and FIG. 12, a device or system can use operations described in the flowchart 1000 to generate an aligned dataset, wherein sensors on odd-indexed pads are combined to form a reference dataset and the even-aligned pads are aligned with respect to the reference dataset. Some of the values in the aligned dataset represented by the aligned, flattened image 1300 can be different from the corresponding values for the same spatial positions in the unaligned dataset represented by the unaligned, flattened image 1200. For example, with reference to FIG. 12, the region 1240 shows three elevated signal bands in the aligned sub-image 1204, whereas the same region 1240 shows a single elevated signal band in the corresponding aligned sub-image 1340 shown in FIG. 13.

FIG. 14 includes a graph of the mean average of measurements in a reference dataset, the mean average of measurements from a second set of sensors before alignment, and the mean average of measurements from a second set of sensors after alignment. FIG. 14 includes a graph 1400 with a horizontal axis 1401 and a vertical axis 1402. The horizontal axis 1401 can represent a mean edge signature in normalized units. The vertical axis 1402 represents a depth of measurement in units of feet. The graph 1400 also includes a reference mean response curve 1411, an unaligned mean response curve 1412, and an aligned reference mean response curve 1413.

The reference mean response curve 1411 can be a curve interpolated from the average measurement values measured by each of a set of sensors on reference pads, wherein the reference pads can be pre-selected, such as before measurements are initiated downhole. For example, with reference to FIG. 3B, the reference pads can include each of the odd-indexed pads 343, 345 in the set of pads 342-345 on the downhole tool 300. The unaligned mean response curve 1412 can be a curve interpolated from the average measurement values measured by each of a set of sensors not on a reference pad. For example, with reference to FIG. 3B, the measurement pads can be each of the even-indexed pads 342, 344 in the set of pads 342-345 on the downhole tool 300 if the odd-indexed pads 343, 345 are used as reference pads. The aligned mean response curve 1413 can be a curve interpolated from the same average measurement values measured by each of the same set of sensors used to measure the data represented by the unaligned mean response curve 1412 after an alignment operation. As can be seen when comparing the three response curves 1411-1413, the aligned mean response curve 1413 is closer, on average, in value to the reference mean response curve 1411 than the unaligned mean response curve 1412. For example, in the region 1421, which includes mean response curve values in the range between the depth of 1003 feet and the depth of 1005 feet, the aligned mean response curve 1413 is closer in value to the reference mean response curve 1411 than the unaligned mean response curve 1412 in the majority of the region 1421. In addition, unaligned mean response curve 1412 includes various local maxima and minima values which are not shown in either the reference mean response curve 1411 or the aligned mean response curve 1413, wherein the local maxima and minima values can represent errors induced by tool motion and/or other sources of measurement errors.

Figure 15:
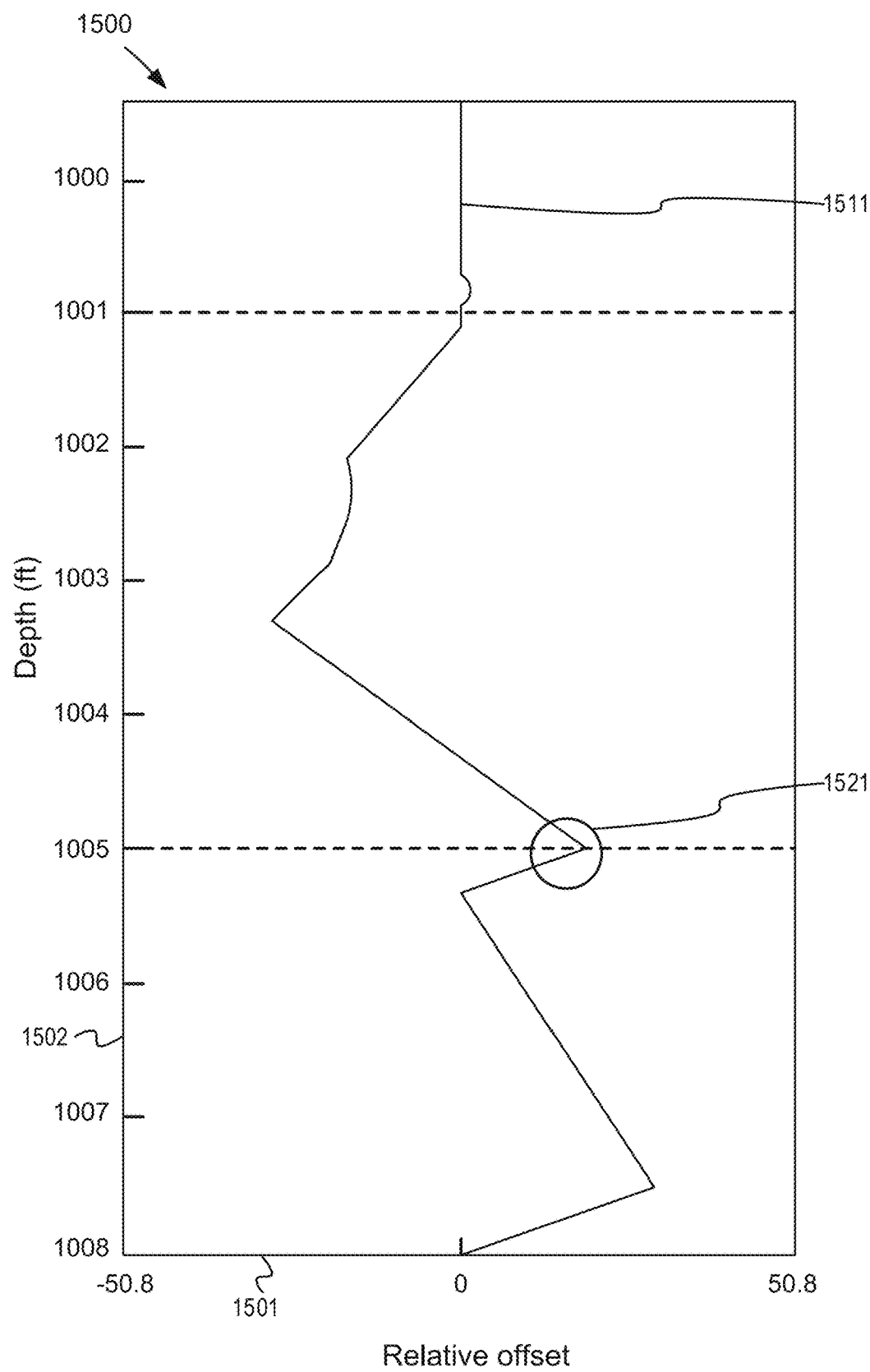
FIG. 15 includes a graph depicting relative shifts used to align even-indexed pad edges to corresponding odd-indexed pad edges in an edge pair association that is calculated to reduce mismatch.

FIG. 15 includes a graph depicting relative shifts used to align even-indexed pad edges to corresponding odd-indexed pad edges in an edge pair association that is calculated to reduce mismatch. Graph 1500 includes a horizontal axis 1501 and a vertical axis 1502. The horizontal axis 1501 represents a relative shift value in units of inches. The vertical axis 1502 represents a depth of measurement in units of feet. The graph 1500 also includes a relative shift log 1511.

The relative shift log 1511 can be formed into a continuous log by interpolating the discrete relative shift values corresponding to each depth for a particular edge to minimize a calculated mismatch. For example, the edge corresponding with a depth of 1005 feet at the circular region 1521 has a relative shift of 19 feet. In some cases, an edge does not have a non-zero corresponding relative shift value. For example, the edge corresponding with the depth 1001 has a relative shift value of 0 feet.

With reference to FIG. 10, the device or system can apply a monotonicity constraint onto the relative shift log 1511 to ensure physical plausibility of the relative shift log using an operation similar to or identical to that described for block 1014. The calculated relative shift values can then be applied to non-reference measurements. For example, if the sensors on the odd-indexed pads are used as references, then the device or system can interpolate measurements from the even-indexed pads to obtain an aligned image. In some embodiments, instead of virtual relative shifts applied to data, the sensors and/or pads holding the sensors can be physically displaced by the relative shift values.

Figure 16:
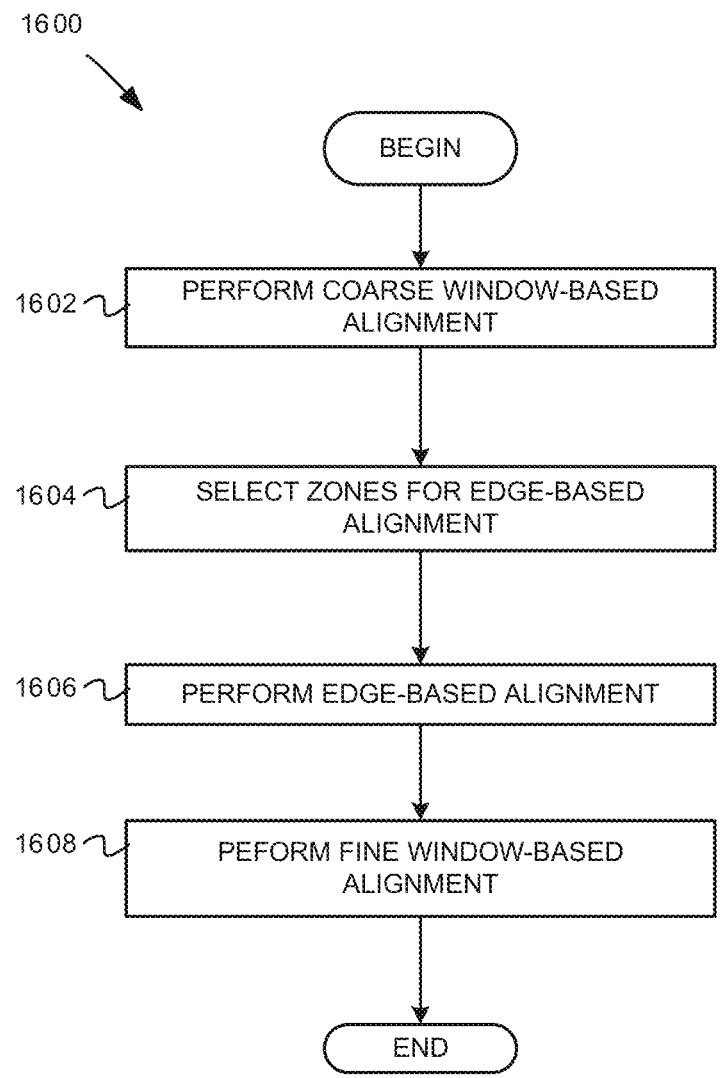
FIG. 16 is a flowchart of operations for a window-based alignment combined with edge-based alignment.

FIG. 16 is a flowchart of operations for a window-based alignment combined with edge-based alignment. Flowchart 1600 describes operations for combining a window-based alignment and a zoned, edge-based alignment of images using a system that includes a processor. For example, operations of flowchart 1600 can be performed using a system similar to the computer device 2200 shown in FIG. 22. Operations of the flowchart 1600 can begin at block 1602.

At block 1602, the device or system performs a coarse, window-based alignment. As used herein, a coarse, window-based alignment is a type of global, window-based alignment that is defined as having a greater window size than a fine, window-based alignment, wherein a fine, window-based alignment is also a type of global, window-based alignment. Operations to perform a coarse, window-based alignment can remove varying shifts indicative of uncontrolled and otherwise random tool motion. The operation to perform a coarse, window-based alignment can also be used to provide mismatch values and relative shift curves. The device or system can select candidate zones for edge-based alignment operations based on these mismatch and relative shift curves. In some embodiments, operations to perform coarse, window-based alignment can be done substantially simultaneously with one or more operations to perform coarse, relative shift alignments described below to reduce computation load.

At block 1604, the device or system selects zones for edge-based alignment. In some embodiments, the device or system can select zones based on a set of criteria. For example, with reference to FIG. 10, one or more of the set of zone selection criteria can be similar to or identical to the criteria described for block 1002.

At block 1606, the device or system performs operations for edge-based alignment within each one of the selected zones. With reference to FIG. 10, above, operations to perform edge-based alignment can be similar to or the identical to those described in the flowchart 1000.

At block 1608, the device or system performs fine, window-based alignment. In some embodiments, the device or system can determine whether or not to perform operations for fine, window-based alignment based an error threshold. Operations to perform the fine, window-based alignment can include reducing a shift size before performing one or more additional window-based alignment operations. These one or more operations can further reduce misalignment, wherein some of the misalignment may have resulted from inaccurate edge depth determination.

To help illustrate operations of the flowchart 1600, an example of both global, window-based alignment and edge-based image alignment applied to a zone is now described in reference to FIGS. 17-20.

Figure 17:
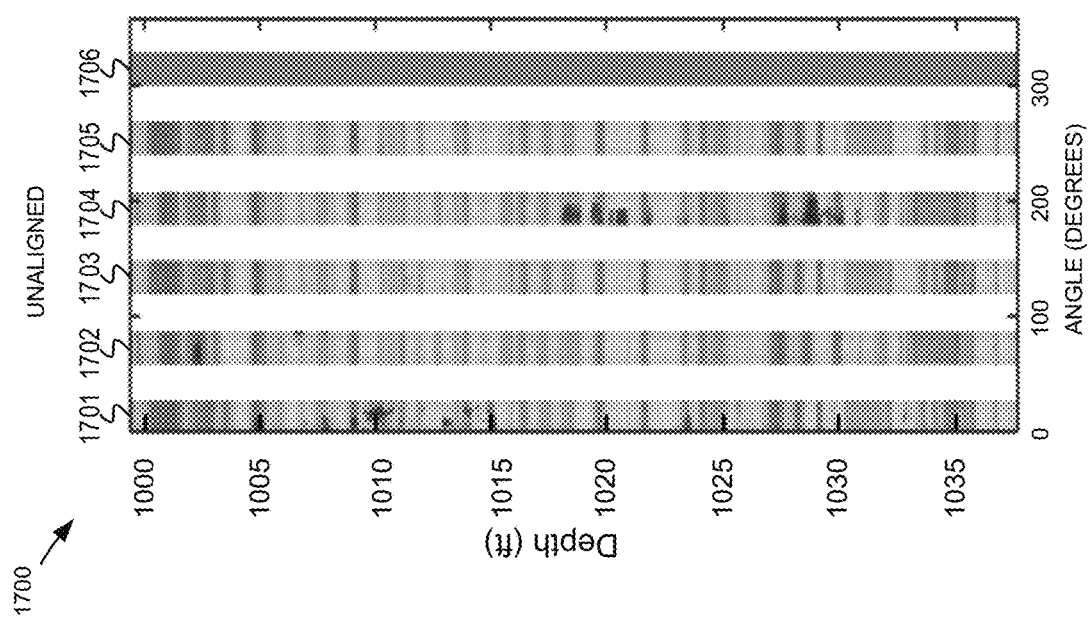
FIG. 17 depicts a third example unaligned image.

FIG. 17 depicts a third example unaligned image 1700. Each of the sub images 1701, 1702, 1703, 1704, 1705, and 1706 represent measurements acquired by a different sensor on a tool, such as tool 300 as illustrated and described with respect to FIG. 3B. Referring again to FIG. 17, many of the sub-images 1701, 1702, 1703, 1704, 1705, and 1706 are shown to be misaligned and unordered.

Figure 18:
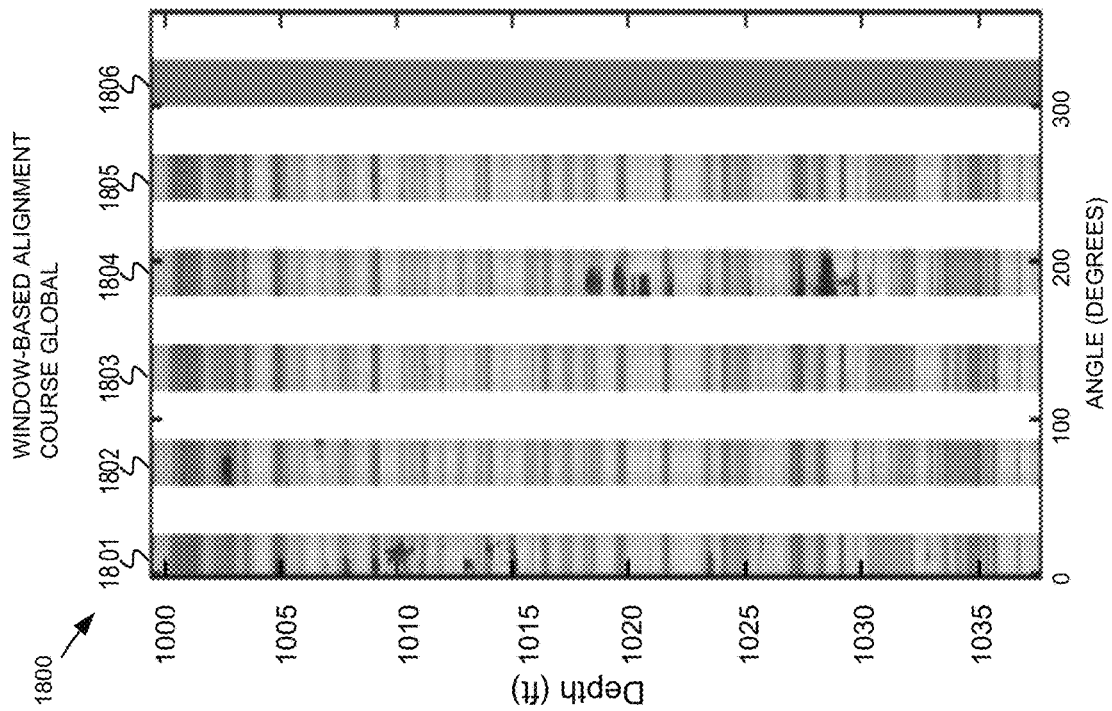
FIG. 18 includes an aligned image resulting from a coarse global, window-based alignment of the unaligned dataset depicted in FIG. 17.

FIG. 18 includes an aligned image 1800 resulting from a coarse global, window-based alignment of the unaligned dataset depicted in FIG. 17. With respect to FIG. 17 and FIG. 18, the data represented by the sub-images 1701, 1702, 1703, 1704, 1705, and 1706 can he aligned using operations described for block 1602 of FIG. 16. Referring again to FIG. 18, the data represented by each of the sub-images 1801, 1802, 1803, 1804, 1805, and 1806 can be separated into windows and aligned using a window based alignment, using windows having a coarse window size within a coarse size range. For example, the coarse size range can have a window size of 20 inches, a maximum relative shift of 10 inches, and an incremental shift step of 0.5 inches.

FIG. 19 includes an image resulting from an edge-based alignment of the coarse global, window-based aligned dataset depicted in FIG. 18. FIG. 19 includes an aligned, flattened image 1900. With respect to FIG. 10 and FIG. 18, a device or system can use operations described for block 1004 and block 1006 to generate an aligned dataset, wherein sensors on odd-indexed pads are combined to form a reference dataset and the even-aligned pads are aligned with respect to the reference dataset. Each the lines 1911, 1912, 1913, 1914, 1915, 1916, and 1917 represents an edge, wherein the datasets represented by the sub-images can be shifted along that respective edge by a relative shift value.

FIG. 20 includes an image 2000 resulting from a fine global, window-based alignment of the edge-based aligned dataset shown in FIG. 19. With respect to FIG. 10 and FIG. 19, the data represented by the sub-images 2001, 2002, 2003, 2004, 2005, and 2006 can be aligned using operations of the flowchart 1000. The data represented by each of the sub-images 2001, 2002, 2003, 2004, 2005, and 2006 can be separated into windows and aligned using a window-based alignment using windows having a fine window size that is within a fine size range, wherein the fine size range is less than a coarse window size. For example, the fine size range can have a window size of 8 inches (which, by definition, is less than the coarse window size of 20 inches used in FIG. 18), a maximum relative shift of 4 inches and an incremental shift step of 0.2 inches.

Figure 21:
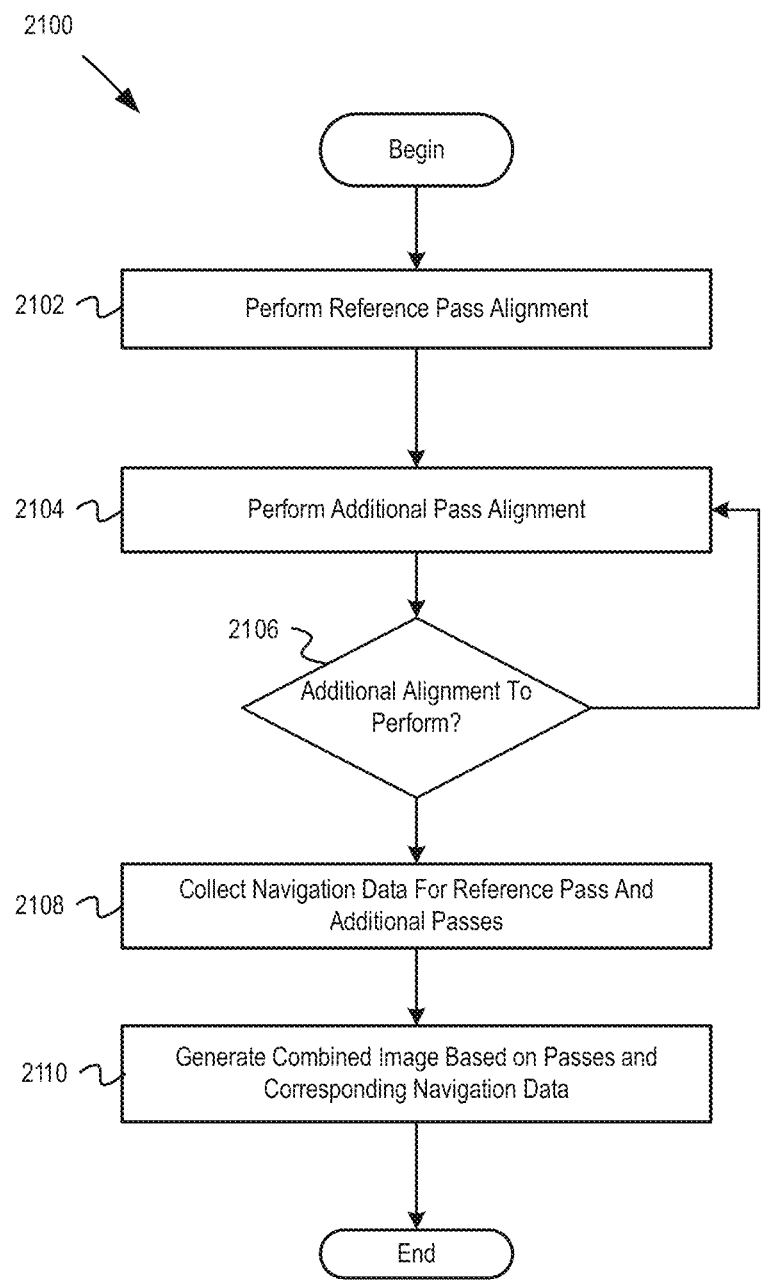
FIG. 21 is a flowchart of operations for aligning and combining images from multiple passes of a downhole tool through a formation to obtain a combined image.

FIG. 21 is a flowchart of operations for aligning and combining images from multiple passes of a downhole tool through a formation to obtain a combined image. The operations depicted in the flowchart 2100 includes operations for aligning and combining images from multiple passes of the tool through a formation using a system that includes a processor. For example, operations of the flowchart 2100 can be performed using a system similar to the computer device 2200 shown in FIG. 22. Operations of the flowchart 2100 can begin at block 2102.

At block 2102, the system or device performs a reference pass alignment. The reference pass alignment can be performed using measurements acquired by a set of sensors during a reference pass of a downhole tool through a portion of a borehole. In some embodiments, with reference to FIG. 5, the alignment can be performed using a global, window-based alignment as described in the operations of flowchart 500. Alternatively, with reference to FIG. 10, the alignment may comprise an edge-based alignment as described in the operations of flowchart 1000. Alternatively, with reference to FIG. 16, the alignment may comprise both a global, window-based alignment and an edge-based alignment as described in the operations of the flowchart 1600.

At block 2104, the system or device performs an additional pass alignment. During the additional pass alignment, the downhole tool can be moved back through the portion of a borehole that has already been measured during the reference pass. The sensors on the downhole tool can be used to acquire an additional set of measurements for performing an additional alignment operation. Operations to perform the alignment can be similar to or identical to those described for block 1602. The images resulting of these one or more additional pass alignments can be combined with previously-aligned images. For example, the system can average values from different passes that correspond to the same physical space.

At block 2106, the system or device determines whether to perform additional alignments. In some embodiments, the device or system can determine whether to perform additional pass alignments based on whether additional measurements from additional passes are available. For example, if the downhole tool performed a total of a reference pass and five passes through the portion of the borehole being measured, the device or system can perform a total of six alignment operations. If the system or device determines that it is to perform an additional alignment operation, operations of the flowchart 1600 can return to block 1604. Otherwise, operations can proceed to block 2108.

At block 2108, the system can collect navigation data for the reference and additional passes. Navigation data can include motion sensor data and accelerometer data, which can be used to further align the images for each of the multiple passes. For example, if accelerometer data indicate that the downhole tool was moving at a significantly greater acceleration during measurements from a third pass in comparison with other passes, the device or system can either compensate for the increased acceleration by applying a pre-determined relative shift to the data, and/or eliminate the values that are based on measurements from the third pass.

At block 2110, the device or system can generate a combined image based on the data from different passes and corresponding navigation data. For example, depth-aligned data from the different passes can be used to generate one combined image by applying appropriate transforms to rotate the images from each pass by a corresponding angle as determined by corresponding navigation data for that pass, forming a combined image from the images of each pass, and averaging values where regions of different images are super-imposed on each other. In some embodiments, the combined image can have a higher borehole coverage than any of the individual passes. For example, measurements from any single pass of a set of ten passes can be used to generate a borehole image stretching across 100 feet of a borehole, but combining the ten sets of depth-aligned measurements from the ten passes can result in a borehole image stretching across 400 feet of the borehole by combining overlapping borehole images.

Figure 22:
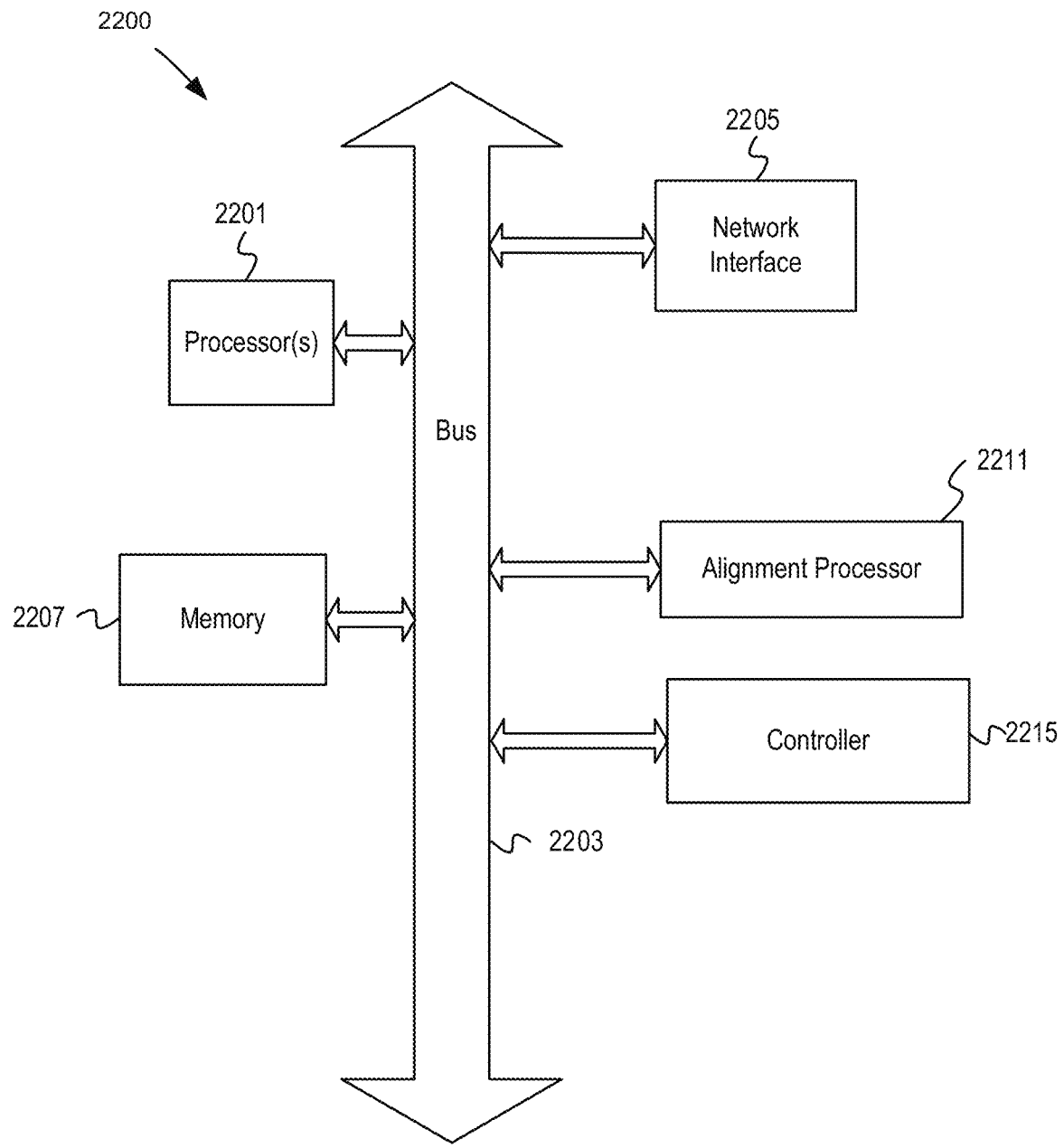
FIG. 22 depicts an example computer device.

FIG. 22 depicts an example computer device. A computer device 2200 includes a processor 2201 (possibly including multiple processors, multiple cores, multiple nodes, and/or implementing multi-threading, etc.). The computer device 2200 includes a memory 2207. The memory 2207 may comprise system memory. Example system memory can include one or more of cache, static random access memory (RAM), dynamic RAM, zero capacitor RAM, Twin Transistor RAM, enhanced dynamic RAM, extended data output RAM, double data rate RAM, electrically erasable programmable read-only memory, nano RAM, resistive RAM, "silicon-oxide-nitride-oxide-silicon memory, parameter RAM, etc., and/or any one or more of the above already described possible realizations of machine-readable media. The computer device 2200 also includes a bus 2203 (e.g., PCI, ISA, PCI-Express, HyperTransport® bus, InfiniBand® bus, NuBus, etc.) and a network interface 2205 (e.g., a Fiber Channel interface, an Ethernet interface, an internet small computer system interface, SONET interface, wireless interface, etc.).

The computer also includes an alignment processor 2211 and a controller 2215. The alignment processor 2211 can perform any of the operations described above. For example, the alignment processor 2211 can perform operations of the flowcharts 400, 500, 600, 1000, 1600 and/or 2100 as described above. The controller 2215 can control the different operations that can occur in the response to results from processing of the images. For example, the controller 2215 can communicate instructions to the appropriate equipment, devices, etc. to alter cementing operations, drilling operations, fracturing operations, etc. The controller 2215 can also perform many of the operations of the flowchart 400 in FIG. 4.

Any one of the previously described functionalities can be partially (or entirely) implemented in hardware and/or on the processor 2201. For example, the functionality can be implemented with an application specific integrated circuit, in logic implemented in the processor 2201, in a co-processor on a peripheral device or card, etc. Further, realizations can include fewer or additional components not illustrated in FIG. 22 (e.g., video cards, audio cards, additional network interfaces, peripheral devices, etc.). The processor 2201 and the network interface 2205 are coupled to the bus 2203. Although illustrated as being coupled to the bus 2203, the memory 2207 can be coupled to the processor 2201. The computer device 2200 can be a device at the surface and/or integrated into component(s) in the borehole.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances can be provided for components, operations or structures described herein as a single instance. Finally, boundaries between various components, operations and data stores are somewhat arbitrary, and particular operations are illustrated in the context of specific illustrative configurations. Other allocations of functionality are envisioned and can fall within the scope of the disclosure. In general, structures and functionality presented as separate components in the example configurations can be implemented as a combined structure or component. Similarly, structures and functionality presented as a single component can be implemented as separate components. These and other variations, modifications, additions, and improvements can fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. A set of items can include one item or a plurality of items. As used herein, the term "or" is inclusive unless otherwise explicitly noted. Thus, the phrase "at least one of A, B, or C" is satisfied by any element from the set {A, B, C} or any combination thereof, including multiples of any element.

Example embodiments include the following:

Embodiment 1: A method comprising generating a set of sub-images of a subsurface formation based on measurement values acquired by a plurality of sensors corresponding to one or more signals that have propagated through the subsurface formation, wherein each of the set of sub-images correspond to one of the plurality of sensors, and wherein the plurality of sensors are on a tool in a borehole, and wherein each of the plurality of sensors are at different spatial positions with respect to each other, and generating a combined image by aligning the set of sub-images based on the measurement values, wherein the aligning of the set of sub-images is independent of acceleration of the tool during tool motion.

Embodiment 2 comprises the method of Embodiment 1, wherein aligning the set of sub-images comprises determining a reference dataset based on a first subset of the set of sub-images, dividing at least one of the set of sub-images into a set of windows, determining a set of mismatch values based on the set of windows and the reference dataset, and aligning the set of sub-images based on relative shift values, wherein the relative shift values are determined based on the set of mismatch values. Embodiment 3 comprises the method of Embodiment 2, further comprising determining a reference formation dip corresponding to a reference window of the reference dataset, and determining a second formation dip corresponding to a second window that is not part of the reference dataset, wherein determining the set of mismatch values comprises comparing measurement values in the reference dataset along a first principal direction and measurement values of the second along a second principal direction, wherein the first principal direction is based on the reference formation dip, and wherein the second principal direction is based on the second formation dip. Embodiment 4 comprises the method of any of Embodiments 2 to 3, wherein the set of windows is a first set of windows, and wherein the method further comprises dividing at least one of the set of sub-images into a second set of windows, wherein a window length of the second set of windows is less than a window length of the first set of windows, determining a second set of mismatch values based on the second set of windows, and aligning the set of sub-images based on a second set of relative shift values, wherein the second set of relative shift values are determined based on the second set of mismatch values.

Embodiment 5 comprises the method of any of Embodiments 1 to 4, wherein aligning the set of sub-images comprises determining a first edge signature value corresponding to a reference dataset, determining a second edge signature value corresponding to a second dataset, determining a mismatch value between the first edge signature value and the second edge signature value, generating a relative shift value based on the mismatch value, and aligning the set of sub-images based on the relative shift value. Embodiment 6 comprises the method of Embodiment 5, further comprising determining one or more zones in at least one of the set of sub-images, and applying conformal mapping to the one or more zones before determining the first edge signature value. Embodiment 7 comprises the method of any of Embodiments 1 to 6, wherein the measurement values are a first set of the measurement values, and wherein the method further comprises lifting the tool from the borehole during a second pass, wherein the plurality of sensors acquires a second set of measurement values during the second pass, and generating the combined image based on the second set of measurement values. Embodiment 8 comprises the method of any of Embodiments 1 to 7, further comprising modifying a downhole operation based on combined image.

Embodiment 9: A system comprising a downhole tool having a plurality of sensors to detect one or more signals that have propagated through a subsurface formation surrounding a borehole, and wherein each of the plurality of sensors are at a different spatial position from each other, a processor, and a machine-readable medium having instructions executable by the processor to cause the processor to generate a set of sub-images of the subsurface formation based on measurement values acquired by the plurality of sensors corresponding to the one or more signals that have propagated through the subsurface formation, and wherein each of the set of sub-images correspond to one of the plurality of sensors, and generate a combined image by aligning the set of sub-images based on the measurement values, wherein the aligning of the set of sub-images is independent of acceleration of the tool during tool motion.

Embodiment 10 comprises the system of Embodiment 9, wherein the instructions executable by the processor to cause the processor to align the set of sub-images comprises instructions executable by the processor to cause the processor to determine a reference dataset based on a first subset of the set of sub-images, divide at least one of the set of sub-images into a set of windows, determine a set of mismatch values based on the set of windows and the reference dataset, and align the set of sub-images based on relative shift values, wherein the relative shift values are determined based on the set of mismatch values. Embodiment 11 comprises the system of Embodiment 10, wherein the instructions executable by the processor to cause the processor to align the set of sub-images comprises instructions executable by the processor to cause the processor to determine a reference formation dip corresponding to a reference window of the reference dataset, and determine a second formation dip corresponding to a second window that is not part of the reference dataset, wherein determining the set of mismatch values comprises comparing measurement values in the reference dataset along a first principal direction and measurement values of the second along a second principal direction, wherein the first principal direction is based on the reference formation dip, and wherein the second principal direction is based on the second formation dip. Embodiment 12 comprises the system of any of Embodiments 10 to 11, wherein the set of windows is a first set of windows, and wherein the instructions executable by the processor to cause the processor to align the set of sub-images comprises instructions executable by the processor to cause the processor to divide at least one of the set of sub-images into a second set of windows, wherein a window length of the second set of windows is less than a window length of the first set of windows, determine a second set of mismatch values based on the second set of windows, and aligning the set of sub-images based on a second set of relative shift values, wherein the second set of relative shift values are determined based on the second set of mismatch values.

Embodiment 13 comprises the system of any of Embodiments 9 to 12, wherein the instructions executable by the processor to cause the processor to align the set of sub-images comprises instructions executable by the processor to cause the processor to determine a first edge signature value corresponding to a reference dataset, determine a second edge signature value corresponding to a second dataset, determine a mismatch value between the first edge signature value and the second edge signature value, generate a relative depth shift value based on the mismatch value, and align the set of sub-images based on the relative depth shift value. Embodiment 14 comprises the system of Embodiment 13, wherein the instructions executable by the processor to cause the processor to align the set of sub-images comprises instructions executable by the processor to cause the processor to determining one or more zones in at least one of the set of sub-images, and applying conformal mapping to the one or more zones before determining the first edge signature value. Embodiment 15 comprises the system of any of Embodiments 13 to 14, wherein the instructions executable by the processor to cause the processor to align the set of sub-images comprises instructions executable by the processor to cause the processor to filter out an edge pair association based on a sign change across an edge of the edge pair association.

Embodiment 16: One or more non-transitory machine-readable media comprising program code to generate a set of sub-images of a subsurface formation based on measurement values acquired by a plurality of sensors corresponding to one or more signals that have propagated through the subsurface formation, wherein each of the set of sub-images correspond to one of the plurality of sensors, and wherein the plurality of sensors are on a tool in a borehole, and wherein each of the plurality of sensors are at different spatial positions with respect to each other, divide at least one of the set of sub-images into a set of windows, generate a relative shift value for at least one of the set of windows, wherein the relative shift value is based on a set of mismatch values corresponding to the at least one the set of windows, wherein the set of mismatch values is determined based on the set of windows, and generate a combined image by aligning the set of sub-images based on the relative shift value.

Embodiment 17 comprises the one or more non-transitory machine-readable media of Embodiment 16, wherein the program code to determine the set of mismatch values comprises program code to determining a first principal axis based on a formation dip corresponding to a reference dataset, wherein the reference dataset comprises a first subset of the set of sub-images, determine a second principal axis based on a formation dip corresponding to a second sub-image, and determining one of the set of mismatch values based on a comparison between the reference dataset and the second sub-image, wherein the first principal axis and the second principal axis are parallel during the comparison. Embodiment 18 comprises the one or more non-transitory machine-readable media of Embodiment 17, wherein the comparison between the reference dataset and the second sub-image comprises at least one of a cross-correlation or a cross-covariance. Embodiment 19 comprises the one or more non-transitory machine-readable media of any of Embodiments 16 to 18, wherein the program code to determine the set of mismatch values comprises program code to use a regularization term, wherein increasing the regularization term increases at least one of the set of mismatch values, and wherein increasing the relative shift value increases the regularization term. Embodiment 20 comprises the one or more non-transitory machine-readable media of any of Embodiments 16 to 19, further comprising determining a plurality of relative shift values, and interpolating the plurality of relative shift values to generate a continuous shift log.

What is claimed is:

1. A method comprising:
   generating a set of sub-images of a subsurface formation extending over a depth range based on measurement values acquired by a plurality of sensors corresponding to one or more signals that have propagated through the subsurface formation, wherein each of the set of sub-images correspond to one of the plurality of sensors, and wherein the plurality of sensors are on a tool in a borehole, and wherein each of the plurality of sensors are at different spatial positions with respect to each other; and
   generating a combined image by aligning the set of sub-images based on the measurement values, wherein the aligning of the set of sub-images is independent of acceleration of the tool during tool motion and wherein aligning the set of sub-images comprises:
   dividing the set of sub-images into a set of windows, each window extending over a predefined depth within the depth range where measurement values forming the sub-images within the window were acquired, and wherein the set of windows include of plurality of windows that are contiguous over the entirety of the depth range to include all of the measurement values acquired by a plurality of sensors over the depth range;
   for each window of the set of windows, determining a mismatch value between the set of sub-images included within the window and a reference dataset, wherein the reference dataset comprises a combined image formed from measurements from a subset of the plurality of sensors, and generating a relative shift value based on the mismatch value determined for the window,
   interpolating a plurality of relative shift values including the relative shift value generated from each of the windows within the set of windows to generate a relative shift log, and
   aligning the set of sub-images based on the relative shift log.

2. The method of claim 1 wherein determining the mismatch value between the set of sub-images comprises comparing one or more measurement values in a first sub-image along a principal direction and one or more measurement values of a second sub-image along a same principal direction, wherein the principal direction is based on a formation dip of the first sub-image.

3. The method of claim 1, wherein the set of windows is a first set of windows, and wherein the method further comprises:
   dividing at least one of the set of sub-images into a second set of windows, wherein a window length of the second set of windows is less than a window length of the first set of windows;
   determining a second set of mismatch values based on the second set of windows; and
   aligning the set of sub-images based on a second set of relative shift values, wherein the second set of relative shift values are determined based on the second set of mismatch values.

4. The method of claim 1, wherein one or more of the relative shift values are determined based on one or more calculated formation properties.

5. The method of claim 1, wherein the measurement values are a first set of the measurement values, and wherein the method further comprises:
   lifting the tool from the borehole during a second pass, wherein the plurality of sensors acquires a second set of measurement values during the second pass; and
   generating the combined image based on the second set of measurement values.

6. The method of claim 1, further comprising modifying a downhole operation based on the combined image.

7. The method of claim 1, wherein the plurality of sensors are positioned in multiple sets of pads that are axially or azimuthally offset.

8. The method of claim 1, wherein generating the set of sub-images of a subsurface formation based on measurement values comprises acquiring a plurality of images over multiple passes of the tool through the borehole.

9. The method of claim 1, further comprising generating a drilling status indicator indicative of a stick-and-slip condition.

10. The method of claim 1, wherein the mismatch value of each window is computed as a function of data consistency, wherein data consistency is defined based on the set of sub-images.

11. The method of claim 1, further comprising setting a global threshold based on combining each of the mismatch values corresponding to each window into a single dataset, and filtering out from the aligning of the sub-images any mismatch values that are above the global threshold.

12. A system comprising:
   a downhole tool having a plurality of sensors to detect one or more signals that have propagated through a subsurface formation surrounding a borehole, and wherein each of the plurality of sensors are at different spatial positions with respect to each other;
   a processor; and
   a non-transitory machine-readable medium having instructions executable by the processor configured to cause the processor to:
   generate a set of sub-images of the subsurface formation extending over a depth range based on measurement values acquired by the plurality of sensors corresponding to the one or more signals that have propagated through the subsurface formation, and wherein each of the set of sub-images correspond to one of the plurality of sensors; and generate a combined image by aligning the set of sub-images based on the measurement values, wherein the aligning of the set of sub-images is independent of acceleration of the downhole tool during tool motion, wherein the instructions for aligning the set of sub-images cause the processor to:

dividing the sub-images into a set of windows, each window extending over a predefined depth within the depth range where measurement values forming the sub-images within the window were acquired, and wherein the set of windows include of plurality of windows that are contiguous over the entirety of the depth range to include all of the measurement values acquired by a plurality of sensors over the depth range, for each window of the set of windows, determining a mismatch value between the set of sub-images included within the window and a reference dataset, wherein the reference dataset comprises a combined image formed from measurements from a subset of the plurality of sensors, and generating a relative shift value based on the mismatch value determined for the windows, interpolating a plurality of relative shift values including the relative shift value generated from each of the windows within the set of windows to generate a relative shift log, and aligning the set of sub-images based on the relative shift log.

13. The system of claim 12, wherein the set of windows is spaced to cover an image representing an entire 360-degree rotation around a borehole over a length of the borehole.

14. The system of claim 12, wherein the instructions for aligning the set of sub-images are configured to cause the processor to:

within each window, determine a principal direction based on a formation dip corresponding to a first sub-image; and determine a mismatch value by comparing one or more measurement values in the first sub-image along a principal direction and one or more measurement values of a second sub-image along a same principal direction.

15. The system of claim 12, wherein the set of windows is a first set of windows, and wherein the instructions for aligning the set of sub-images are configured to cause the processor to:

dividing at least one of the set of sub-images into a second set of windows, wherein a window length of the second set of windows is less than a window length of the first set of windows;

determining a second set of mismatch values based on the second set of windows; and aligning the set of sub-images based on a second set of relative shift values, wherein the second set of relative shift values are determined based on the second set of mismatch values.

16. The system of claim 12, wherein the system is configured to modify a downhole operation based on the combined image.

17. The system of claim 12, wherein the plurality of sensors are positioned in multiple sets of pads that are axially or azimuthally offset.

18. The system of claim 12, wherein the instructions for aligning the set of sub-images are configured to cause the processor to generate a drilling status indicator indicative of a stick-and-slip condition.

19. One or more non-transitory machine-readable media comprising program code executable by a processor configured to cause the processor to:

generate a set of sub-images of a subsurface formation extending over a depth range based on measurement values acquired by a plurality of sensors corresponding to one or more signals that have propagated through the subsurface formation, wherein each of the set of sub-images correspond to one of the plurality of sensors, and wherein the plurality of sensors are on a tool in a borehole, and wherein each of the plurality of sensors are at different spatial positions with respect to each other; and generate a combined image by aligning the set of sub-images based on the measurement values, wherein the aligning of the set of sub-images is independent of acceleration of the tool during tool motion and wherein aligning the set of sub-images comprises:

dividing the sub-images into a set of windows, each window extending over a predefined depth within the depth range where measurement values forming the sub-images within the window were acquired, and wherein the set of windows include of plurality of windows that are contiguous over the entirety of the depth range to include all of the measurement values acquired by a plurality of sensors over the depth range, for each window of the set of windows, determining a mismatch value between the set of sub-images included within the window and a reference dataset, wherein the reference dataset comprises a combined image formed from measurements from a subset of the plurality of sensors, and generating a relative shift value based on the mismatch value determined for the windows, interpolating a plurality of relative shift values including the relative shift value generated from each of the windows within the set of windows to generate a relative shift log;

aligning the set of sub-images based on the relative shift log.

20. The one or more non-transitory machine-readable media of claim 19, further comprising instructions to cause the processor to interpolate the relative shift values to generate a continuous shift log.

* * * * *